US010491334B2

(12) United States Patent
Roessel et al.

(10) Patent No.: US 10,491,334 B2
(45) Date of Patent: Nov. 26, 2019

(54) FLEXIBLE UNIVERSAL EXTENDED FRAME STRUCTURE

(71) Applicant: Intel IP Corporation, Santa Clara, CA (US)

(72) Inventors: Sabine Roessel, Munich (DE); Holger Neuhaus, Munich (DE); Bertram Gunzelmann, Neubiberg (DE); Yeong-Sun Hwang, Oberhaching (DE); Jong-Kae Fwu, Sunnyvale, CA (US); Xiangyang Zhuang, Santa Clara, CA (US)

(73) Assignee: Intel IP Corporation, Santa Clara, CA (US)

( * ) Notice: Subject to any disclaimer, the term of this patent is extended or adjusted under 35 U.S.C. 154(b) by 43 days.

(21) Appl. No.: 15/765,240

(22) PCT Filed: Apr. 2, 2016

(86) PCT No.: PCT/US2016/025773
§ 371 (c)(1),
(2) Date: Mar. 30, 2018

(87) PCT Pub. No.: WO2017/065830
PCT Pub. Date: Apr. 20, 2017

(65) Prior Publication Data
US 2018/0254851 A1 Sep. 6, 2018

Related U.S. Application Data

(60) Provisional application No. 62/242,958, filed on Oct. 16, 2015.

(51) Int. Cl.
*H04L 1/00* (2006.01)
*H04L 1/18* (2006.01)
(Continued)

(52) U.S. Cl.
CPC ............ *H04L 1/009* (2013.01); *H04L 1/1861* (2013.01); *H04L 1/1893* (2013.01); *H04W 72/0446* (2013.01); *H04W 84/045* (2013.01)

(58) Field of Classification Search
None
See application file for complete search history.

(56) References Cited

U.S. PATENT DOCUMENTS

| 2009/0116427 A1* | 5/2009 | Marks | ................... H04L 5/0007 370/328 |
|---|---|---|---|
| 2011/0110444 A1* | 5/2011 | Roh | ...................... H04L 1/0003 375/260 |
| 2013/0215844 A1* | 8/2013 | Seol | .................... H04W 72/046 370/329 |

FOREIGN PATENT DOCUMENTS

EP 2919402 A1 9/2015

OTHER PUBLICATIONS

NTT DOCOMO et al; 5G Vision for 2020 and Beyond; 3GPP Draft; RWS-150051; Sophia-Antipolis, France; Sep. 3, 2015.
(Continued)

*Primary Examiner* — Brian S Roberts
(74) *Attorney, Agent, or Firm* — Thorpe North & Western

(57) ABSTRACT

Technology for an eNodeB to communicate with a user equipment (UE) using a extended downlink (DL) self-contained frame within a wireless communication network is disclosed. The eNodeB can process data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the
(Continued)

Nth subframe including one or more resource elements configured for UL control data. The eNodeB can process the extended DL self-contained frame for transmission to the UE.

30 Claims, 15 Drawing Sheets

(51) Int. Cl.
    *H04W 72/04*     (2009.01)
    *H04W 84/04*     (2009.01)

(56) References Cited

OTHER PUBLICATIONS

Zte et al; Discussions on HARQ operation for NR; 3GPP Draft; R1-164276; Sophia-Antipolis, France; May 14, 2016.
Huwaei, et al; Views on LTE Rel-14; 3GPP Draft; RP-151356; Sophia-Antipolis, France; Sep. 8, 2015.

* cited by examiner

| Baseline 800 Mhz, 4x4 MIMO, DL 250QAM, Category | DL Peak (Gbps) | Min. UE delay in SF+1 = MinSFB length | UL Delay (ms) | Max. DL #HARQ process | Max. Distance of UL-control data | Min. BS delay in SF | BS Delay (ms) | SF (ms) | UL AssociateD (Gbps) |
|---|---|---|---|---|---|---|---|---|---|
| #1 | 16 | 1 | 1.0 | 1.0 | 1.0 | 0.0 | | 0.2 | 12 |
| #m+1 | 16 | 6 | <<0.2 | 12.0 | 5.0 | 5.0 | <<0.2 | 0.2 | 0.0 |
| #m+2 | 12.8 | 6 | 1.0 | 12.0 | 4.0 | 5.0 | 1.0 | 0.2 | 2.4 |
| #m+3 | 12.0 | 6 | 1.0 | 8.0 | 3.0 | 5.0 | 1.0 | 0.2 | 3.0 |
| #m+4 | 10.7 | 6 | 1.0 | 6.0 | 2.0 | 5.0 | 1.0 | 0.2 | 4.0 |
| #m+5 | 8.0 | 11.0 | 2.0 | 16.0 | 5.0 | 5.0 | 1.0 | 0.2 | 6.0 |
| #n | 12.8 | 11.0 | 2.0 | 20.0 | 5.0 | 10.0 | 2.0 | 0.2 | 2.4 |
| #n+k | 12.8 | 19.0 | 3.6 | 28.0 | 5.0 | 10.0 | 2.0 | 0.2 | 2.4 |

FLEXIBLE UNIVERSAL EXTENDED FRAME STRUCTURE

BACKGROUND

Wireless mobile communication technology uses various standards and protocols to transmit data between a node (e.g., a transmission station such as an eNodeB) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi. In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node to the wireless device (e.g., UE), and the uplink (UL) transmission can be a communication from the wireless device to the node.

Reducing data transmission latency, reducing HARQ-ACK transmission latency, and reducing downlink (DL) and/or Uplink (UL) traffic adaptation is a major challenge in current systems. For example, longer Hybrid automatic repeat request (HARQ) acknowledgement (HARQ-ACK) transmission latency is expected for certain downlink (DL) and uplink (UL) configurations due to the fact that the DL or UL subframe may not be available at the time for HARQ-ACK transmission.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 9 illustrates a table of UE categories matched into 5 subframes of enhanced self-contained time frame of time division duplex (TDD) coordination grid over different minimum lengths of the enhanced self-contained time frame in accordance with an example;

Figure 1:
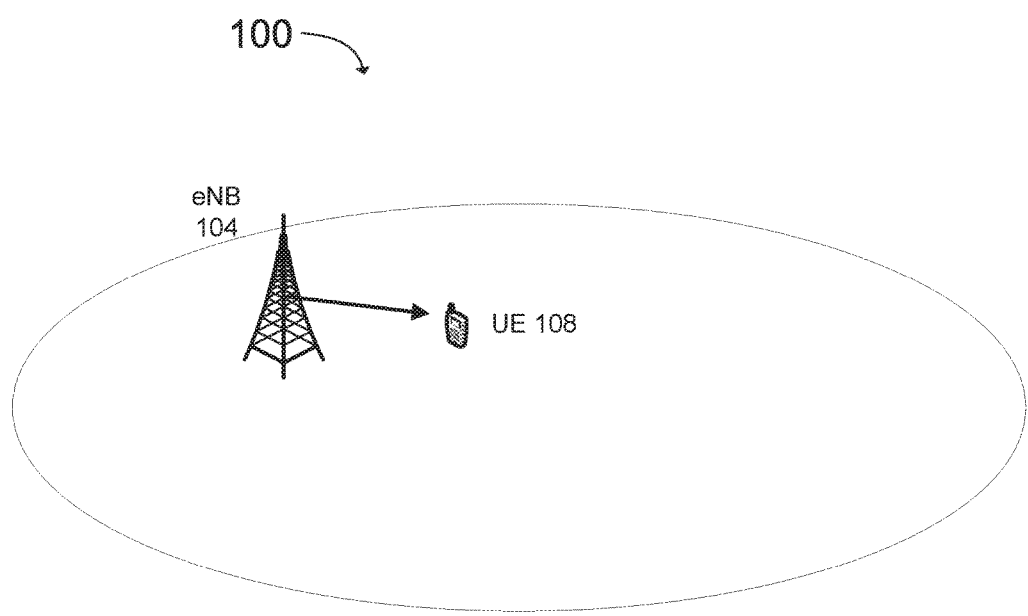
FIG. 1 illustrates a mobile communication network within a cell in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In one aspect, the present technology provides a solution to create a flexible enhanced self-contained frame for reducing UL/DL collision avoidance, provide increased energy efficiency, provide simultaneous support for multiple UE categories, and configurable to provide one or more types of subframes. In one aspect, the enhanced self-contained frame, for downlink traffic, may contain a DL grant, DL data, and UL response acknowledgement/negative acknowledgment (ACK/NACK). In one aspect, the enhanced self-contained frame can be on a single subframe based on subframes that can be staggered in a pipeline to achieve a highest possible throughput. Additionally, the enhanced self-contained frame can provide an UL/DL flexibility using enhanced Interference Management and Traffic Adaptation (eIMTA).

Technology for an eNodeB to communicate with a user equipment (UE) using an extended downlink (DL) self-contained frame within a wireless communication network is disclosed. The eNodeB can process data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data. The eNodeB can process the extended DL self-contained frame for transmission to the UE.

In one aspect, the present technology provides for a UE to communicate with an eNodeB using a extended self-contained frame within a wireless communication network. The UE can process an extended downlink (DL) self contained frame, received from an eNodeB comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data; and process the extended DL self-contained frame for transmission to the UE. The UE can comprise one or more processors and memory configured to: process an extended downlink (UL) self-contained frame, for transmission to the eNodeB, wherein the extended UL self-contained frame comprises: a first subframe including DL control data, an eNodeB acknowledgement (ACK)/ negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and an Pth subframe that is subsequent to the Ith subframe, the Ith subframe including one or more resource elements configured for UL control data, reference symbols, and UL data, wherein P is a positive integer that is greater than one.

In one aspect, the present technology provides for an eNodeB to communicate with a user equipment (UE) using an extended downlink (DL) self-The eNodeB can comprise one or more processors and memory configured to: process data to form an extended downlink (DL) self contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data; and process the extended DL self-contained frame for transmission to the UE. The eNodeB can process an extended downlink (UL) self-contained frame, received from the UE, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and an Pth subframe that is subsequent to the Ith subframe, the Ith subframe including one or more resource elements configured for UL control data, reference symbols, and UL data, wherein P is a positive integer that is greater than one.

As such, the enhanced self-contained frame (e.g., an enhanced UL self-contained frame or an enhanced DL self contained frame) can 1) provide a highest UL/DL flexibility for a single UE and 2) provide more efficient forward compatibility by decoupling a hybrid automatic repeat request (HARQ) scheduling timing dependency across a subframe or block of subframes, and 3) a cell-wide coordinated frame structure resembling the LTE TDD and/or an eIMTA scheme allows for avoiding UL/DL collisions both at a base station as well as at the a mobile device.

In one aspect, the enhanced self-contained frame can be a third generation partnership (3GPP) long-term evolution (LTE) fifth generation (5G) flexible and universal enhanced self-contained frame structure. The enhanced DL self-contained frame can prevent UL/DL collision avoidance (e.g. if beamforming is not possible or insufficient). In one aspect, the UL transmission of one user equipment can "spill into" a DL transmission of an alternative UE. The enhanced self-contained frame can prevent UL/DL collision avoidance since the minimum coupling loss for a downlink transmission of a base station DL is not sufficient to protect the base station receiver ("full duplex" operation at a 3GPP 5G base station). In one aspect, the enhanced self-contained frame can provide energy savings in the UE since the power savings can be achieved at the UE by optimizing the UL transmission pattern (e.g., provide more seldom and longer pauses).). In one aspect, the enhanced self-contained frame can simultaneously support multiple UE categories. For example the enhanced self-contained frame can enable flexibility of simultaneously supporting multiple UE categories without parameterizing an air interface numerology by at least covering sub 6 gigahertz (GHz), center-meter Waves (cmWaves) and millimeter Waves (mmWave). The enhanced self-contained frame can provide different device operation modes and trade-off energy consumption as compared to latency as compared to throughput (e.g., energy consumption vs. latency vs. throughput). In one aspect, the enhanced self-contained frame can be configurable to simultaneously implement one or more different types of subframes.

FIG. 1 illustrates a mobile communication network within a cell 100 having an evolved node B (eNB or eNodeB) with a mobile device. FIG. 1 illustrates an eNB 104 that can be associated with an anchor cell, macro cell or primary cell. Also, the cell 100 can include a mobile device, such as, for example, a User Equipment (UE or UEs) 108 that can be in communication with the eNB 104. The eNB 104 can be a station that communicates with the UE 108 and can also be referred to as a base station, a node B, an access point, and the like. In one example, the eNB 104 can be a high transmission power eNB, such as a macro eNB, for coverage and connectivity. The eNB 104 can be responsible for mobility and can also be responsible for radio resource control (RRC) signaling. The UE or UEs 108 can be supported by the macro eNB 104. The eNB 104 can provide communication coverage for a particular geographic area. In 3GPP, the term "cell" can refer to a particular geographic coverage area of eNB and/or an eNB subsystem serving the coverage area with an associated carrier frequency and a frequency bandwidth, depending on the context in which the term is used.

Figure 2:
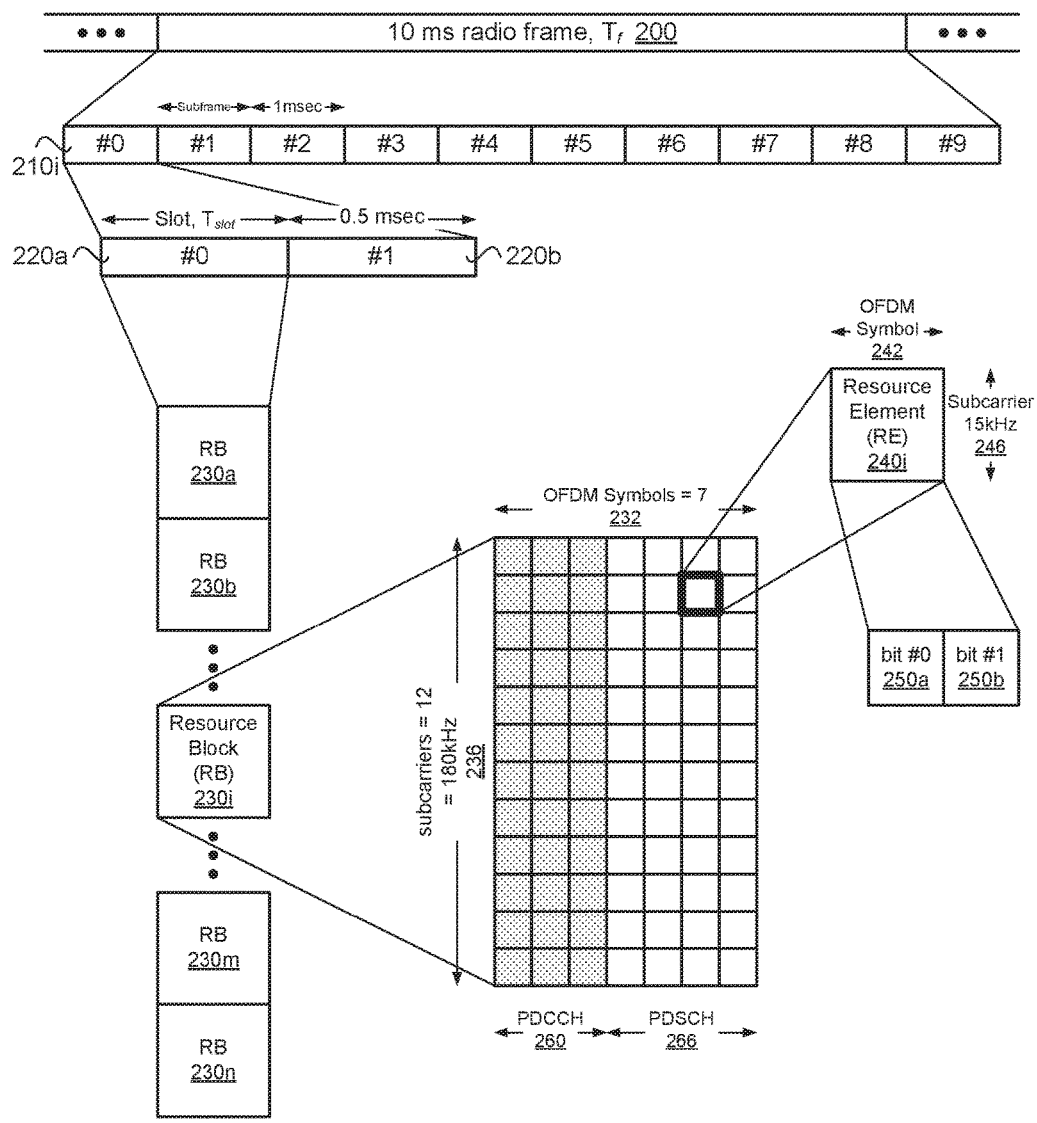
FIG. 2 illustrates a diagram of radio frame resources (e.g., a resource grid) for a downlink (DL) transmission including a physical downlink control channel (PDCCH) in accordance with an example.

FIG. 2 illustrates a diagram of radio frame resources (e.g., a resource grid) for a downlink (DL) transmission including a physical downlink control channel (PDCCH) in accordance with an example. In the example, a radio frame 200 of a signal used to transmit the data can be configured to have a duration, Tf, of 10 milliseconds (ms). Each radio frame can be segmented or divided into ten subframes 210*i* that are each 1 ms long. Each subframe can be further subdivided into two slots 220*a* and 220*b*, each with a duration, Tslot, of 0.5 ms. In one example, the first slot (#0) 220*a* can include a physical downlink control channel (PDCCH) 260 and/or a physical downlink shared channel (PDSCH) 266, and the second slot (#1) 220*b* can include data transmitted using the PDSCH.

Each slot for a component carrier (CC) used by the node and the wireless device can include multiple resource blocks (RBs) 230*a*, 230*b*, 230*i*, 230*m*, and 230*n* based on the CC frequency bandwidth. The CC can include a frequency bandwidth and a center frequency within the frequency bandwidth. In one example, a subframe of the CC can include downlink control information (DCI) found in the PDCCH. The PDCCH in the control region can include one to three columns of the first OFDM symbols in a subframe or physical RB (PRB), when a legacy PDCCH is used. The remaining 11 to 13 OFDM symbols (or 14 OFDM symbols, when legacy PDCCH is not used) in the subframe can be allocated to the PDSCH for data (for short or normal cyclic prefix). For example, as used herein, the term 'slot' may be used for 'subframe', or 'transmission time interval (TTI)' can be used for 'frame' or 'frame duration'. In addition, a frame may be considered a user transmission specific quantity (such as a TTI associated with a user and a data flow).

Each RB (physical RB or PRB) 230*i* can include 12 subcarriers 236 of 15 kHz subcarrier spacing, for a total of 180 kHz (on the frequency axis) and 6 or 7 orthogonal frequency-division multiplexing (OFDM) symbols 232 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 240*i* using short or normal cyclic prefixing, or the resource block can be mapped to 72 REs (not shown) using extended cyclic prefixing. The RE can be a unit of one OFDM symbol 242 by one subcarrier (i.e., 15 kHz) 246.

Each RE can transmit two bits 250*a* and 250*b* of information in the case of quadrature phase-shift keying (QPSK) modulation. Other types of modulation can be used, such as 16 quadrature amplitude modulation (QAM) to transmit 4 bits per RE or 64 QAM to transmit six bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

Figure 3:
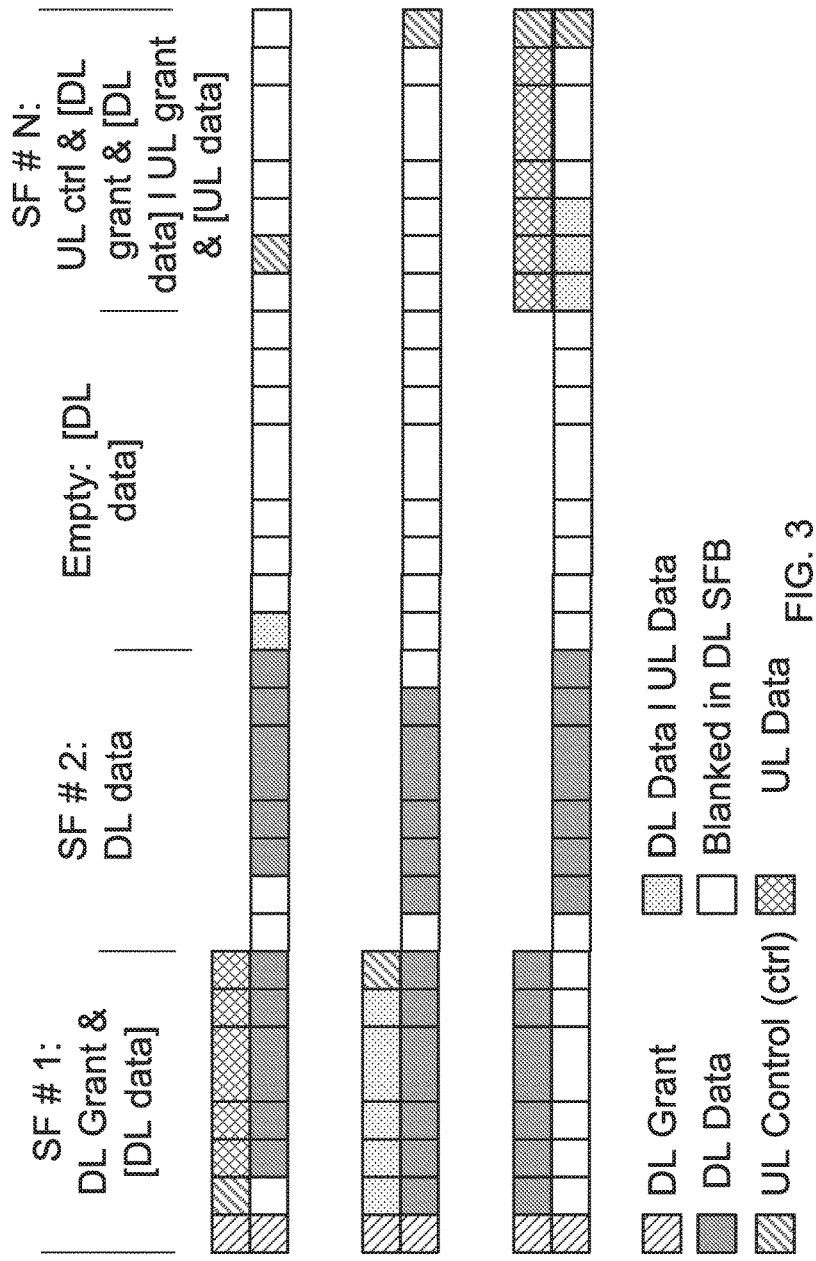
FIG. 3 illustrates a block diagram of an extended (DL) self-contained frame in accordance with an example.

FIG. 3 illustrates a block diagram 300 of an extended (DL) self-contained frame. That is, FIG. 3 depicts the extended (DL) self-contained frame (e.g., a subframe Block "SFB" with examples of different types of subframes underneath, which can be for a single UE and a single DL transmission (or re-transmission).

In one aspect, an extended (DL) self-contained frame can include one or more subframes (SF), such as, for example, SF #1, SF #2, empty SFs, and up to SF #N, where N is a positive integer. One or more empty subframes can be included, such as the empty subframe. For example, SF #1 (the leading SF) can include DL grant, DL data, UL control information, DL data/UL data resource elements, and blanked data in DL SFB. The SF #2 can include DL data. One or more empty SFs can be empty (e.g., blanked) of DL data. The SF #N (e.g., a trailing subframe) can include UL control data, an UL grant and/or UL data.

In one aspect, the first two rows of FIG. 3 depict a subframe for achieving low latency and energy consumption using, for example, a 3GPP LTE 5G TDD mode optimization and usage within the SFB. In the second two rows (3rd and 4th rows) of FIG. 3, a "self-contained" subframe is illustrated that contains DL grant, DL data, UL control data, DL data and UL data, and blank/empty resource elements. In third set of two rows (e.g., the 5th and 6th rows of FIG. 3) DL and UL subframes are depicted (e.g., DL and UL subframes from an eIMTA-based 3GPP LTE TDD framework) that can be used within the SFB. In one aspect, with an additional request to exploit blanking in the different subframe schemes, which can be achieved as long as the DL data to transport block (TB) block matching of the original subframe structure is not affected, multiple different subframes can be dealt with within a single SFB scheme In one aspect, the extended (DL) self-contained frame can be a two-layered architecture. In one aspect the extended (DL) self-contained frame can be a DL subframe block (SFB or "extended (DL) self-contained frame") that can contain: 1) DL control data, 2) DL data, 3) UL control data, and 4) reference symbols (RSs). The SFB can include one or more subframes (SF). Each SF can include data symbols for data transmission. A leading SF (e.g., first most SF in the extended DL self-contained frame) can include the DL control data and a trailing SF (e.g., a last most SF in the extended DL self-contained frame) can include the UL control data, which can also be replaced by data. In one aspect, the data symbols in the extended (DL) self-contained frame can be punctured by an eNodeB-controlled pattern to allow UL control of other/alternative UEs with shifted SFBs or extended (DL) self-contained frames of different sizes.

Figure 4:
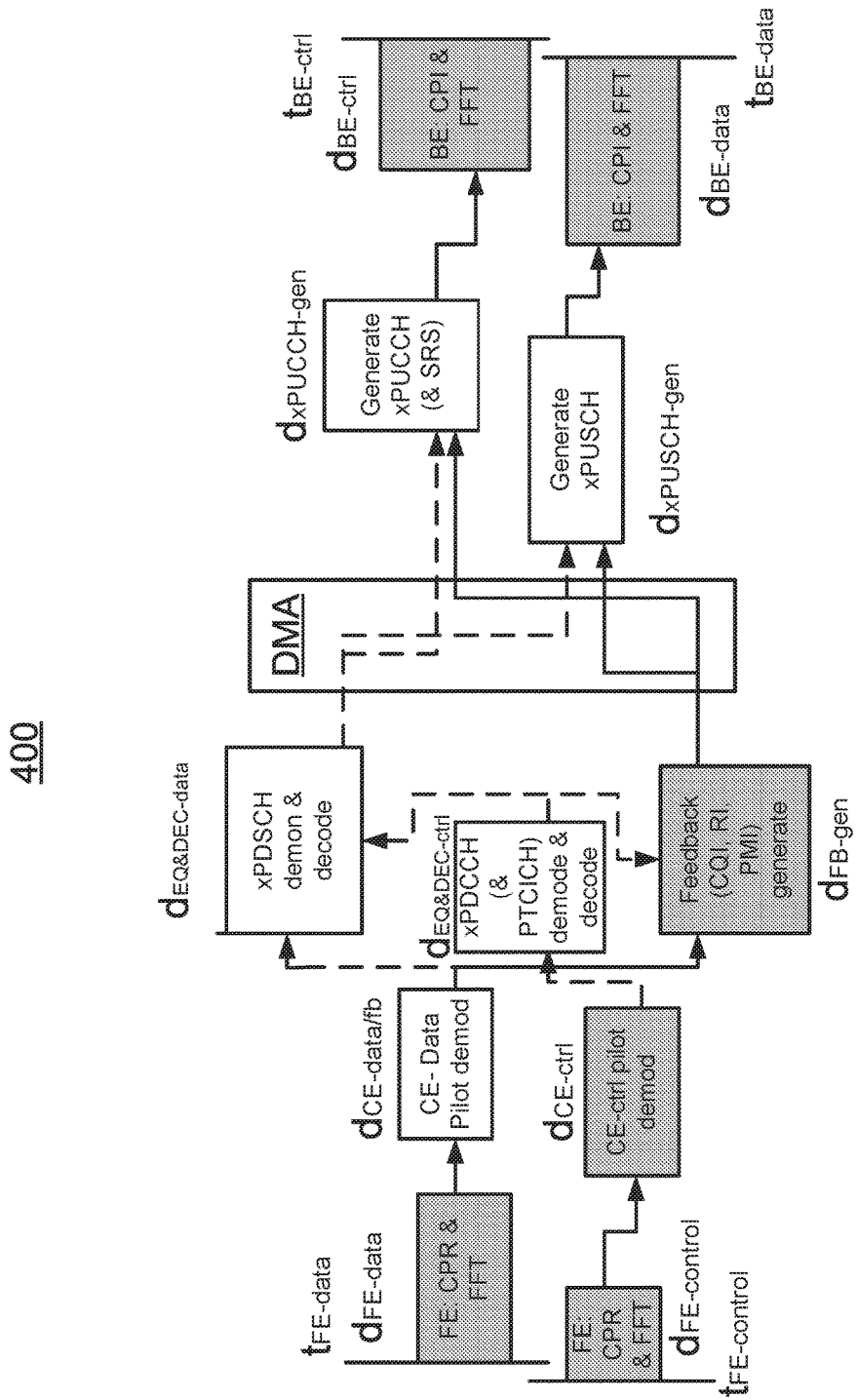
FIG. 4 illustrates a critical path for data reception on a user equipment (UE) receiver for the extended (DL) self-contained frame in accordance with an example.

In one aspect, the size of the extended (DL) self-contained frame (e.g., the SFB size) can be defined as a minimum number of SFs in the extended (DL) self-contained frame that are related to UE categories with various categories allowed at the same time in the network (see FIG. 4). The SFB length of one SF can be defined as a self-contained SF. In one aspect, a network may configure the SFB size to be at and/or above a minimum SFB size supported size by a UE.

In one aspect, the extended (DL) self-contained frame (e.g., using an UL SF, such as SF #N) can include either UL ctrl data and/or DL data (or empty/blank SF). In one aspect, a periodicity or pattern controlled by eNB can be an overlaid eIMTA pattern. The control data can be disabled completely and collected for aggregated transmission in an UL SF with the benefit of PA/UE TX related power savings. The UL control data can include (e.g., carry) an identification (ID) to relate to the correct DL data blocks.

In one aspect, the extended (DL) self-contained frame can include a DL SF (e.g., using a DL SF, such as SF #1-2). The DL SF can include multiple types of DL SFs supported in a wireless network per type symbol position of potential DL control data, UL control data, and DL data. The multiple types of DL SF supported in the network can either be a pre-defined set of types or pattern signaling of symbol allocation. In one aspect, UL symbol positions can determine DL data symbol blanking patterns configured by eNBs In one aspect, the extended self-contained frame can provide and/or assist with the allocation of DL and UL data transmission. The extended self-contained frame can be controlled by the eNodeB and operating in one of two modes (UE and eNB capability). In a first mode, the eNB can operate using complete (full) dynamic control via DL control data, using the extended self-contained frame. Using the extended self-contained frame, the eNodeB can coordinate UL/DL transmission so that no UL/DL collisions occur. In one aspect, the extended self-contained frame can be for DL transmission by default. The DL can contain an UL grant with configurable distance to UL data. Dynamic reaction capability and fast reaction times are provided in UEs from decoded DL control data to potential UL data grant.

Figure 7:
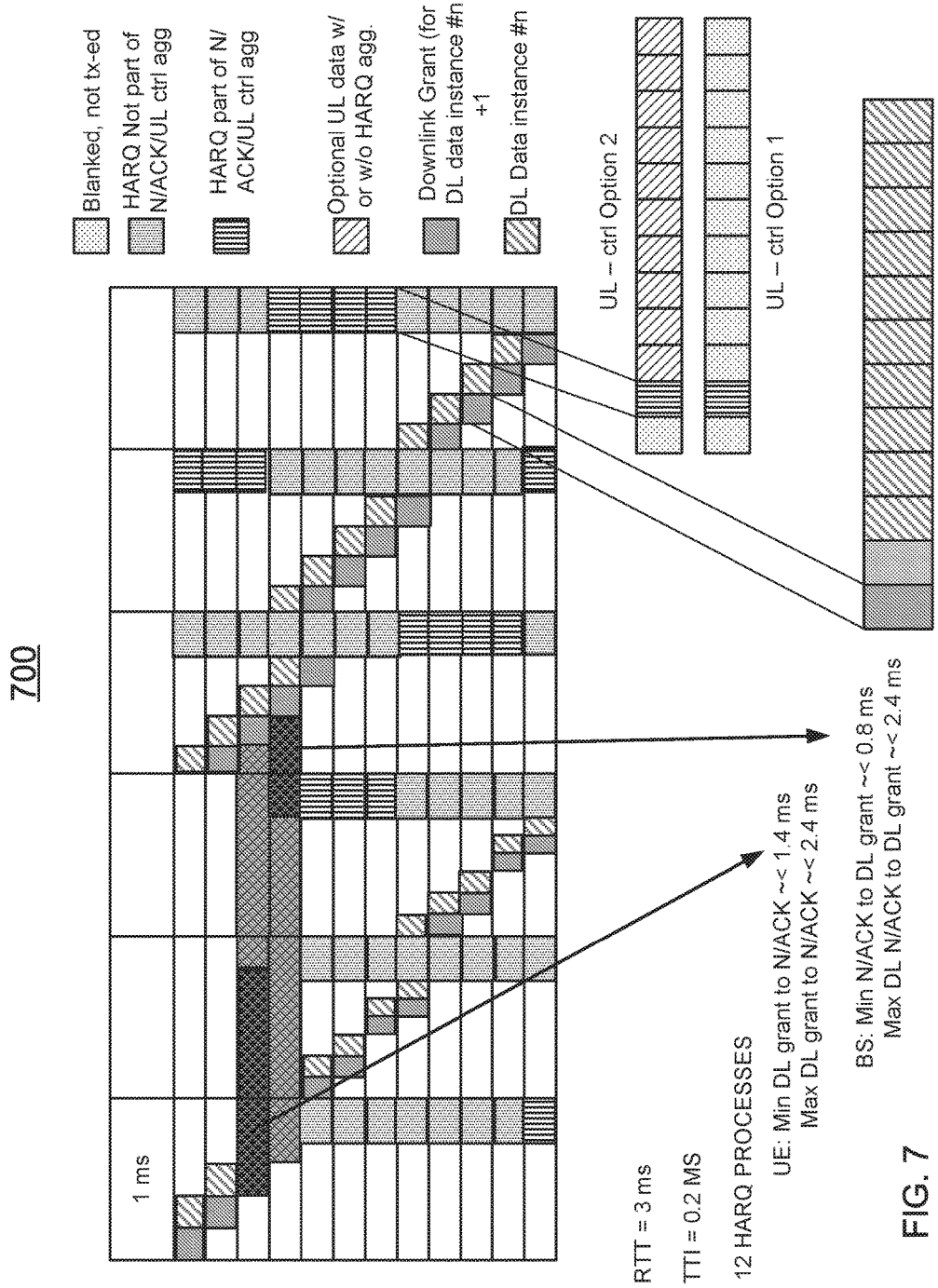
FIG. 7 illustrates a block diagram of a two layer structure for an extended (DL) self-contained frame in accordance with an example.
Figure 8:
FIG. 8 illustrates a first example of a high performance device category of an enhanced self-contained time frame operating at 2 milliseconds (ms) round trip time (RTT) in accordance with an example.

In a second mode, the eNodeB can operate with pre-defined eIMTA patterns (see FIGS. 7-8). In one aspect, the predefined eIMTA patterns can be categorized into different classes, supported by eNB and UE respectively. In one aspect, the predefined eIMTA patterns can be patterns of DL SFs and UL SFs. In one aspect, the predefined eIMTA patterns can define that the DL SFs contiguous length can match a UE having longest SFB. In one aspect, the predefined eIMTA patterns can define that an UL grant in DL control data can dynamically override the predefined eIMTA patterns. In one aspect, the UE can dynamically override the predefined eIMTA patterns. In one aspect, the predefined eIMTA patterns can allow a UE-design based on a most complex defined supported pattern scheme.

In one aspect, the extended (DL) self-contained frame can provide one or more additional dimensions for UE categories, as described in Table 1 of FIG. 9). For example, one or more DL HARQ processes can be supported by a UE. A minimum number of SFs forming the extended (DL) self-contained frame can reflect the UE receiver's minimum latency (e.g., a critical path) from a DL transmission grant mapped to a UE ACK/NACK.

In one aspect, the extended (DL) self-contained frame can provide one or more additional dimensions for eNode classes. In one aspect, the additional dimensions for eNode classes can include one or more UL HARQ processes that are supported at a base station per UE. In one aspect, the additional dimensions for eNode classes can include a minimum number of SFs used for data transmission from the UE (e.g., UE transmission "Tx") or a UE ACK/NACK mapped to eNB ACK/NACK or DL grant for resource element transmission (e.g., "ReTx").

Turning now to FIG. 4, a critical path for data reception on a user equipment (UE) receiver for the extended (DL) self-contained frame is depicted. In one aspect, FIG. 4 depicts an orthogonal frequency division multiplexing (OFDM) receiver (e.g., a UE receiver) whose time on the critical path for the reception of data from the DL grant to the UL ACK/NACK depends on the implementation technology, such as, for example, manufacturing technology, the functional architecture, as well as on the UE receiver algorithm complexity. It should be noted that the UE receiving includes one or more components that generate, use, and/or include a front end (FE), fast Fourier transform, a cyclic prefix removal (CPR), a channel equalizer (CE), a backend (BE), and a cell preference indicator (CPI).

In one aspect, a first parameter of the DL critical path can define a minimum amount of consecutive SFs in an extended downlink (DL) self-contained frame (e.g., DL SFB) and the latency that the UE can support. In one aspect, a second parameter of the DL critical path indicates that the DL HARQ memory and/or a maximum number of DL HARQ processes supported in the device can constitute one or more UE categories. The Round Trip Time (RTT) in the system depends on the UE receiver's critical path as well as on the critical path of the BS receiver, which in the DL transmission case relates to the minimum amount of SFs for the time from UE ACK/NACK to DL (re-transmission).

Figure 5:
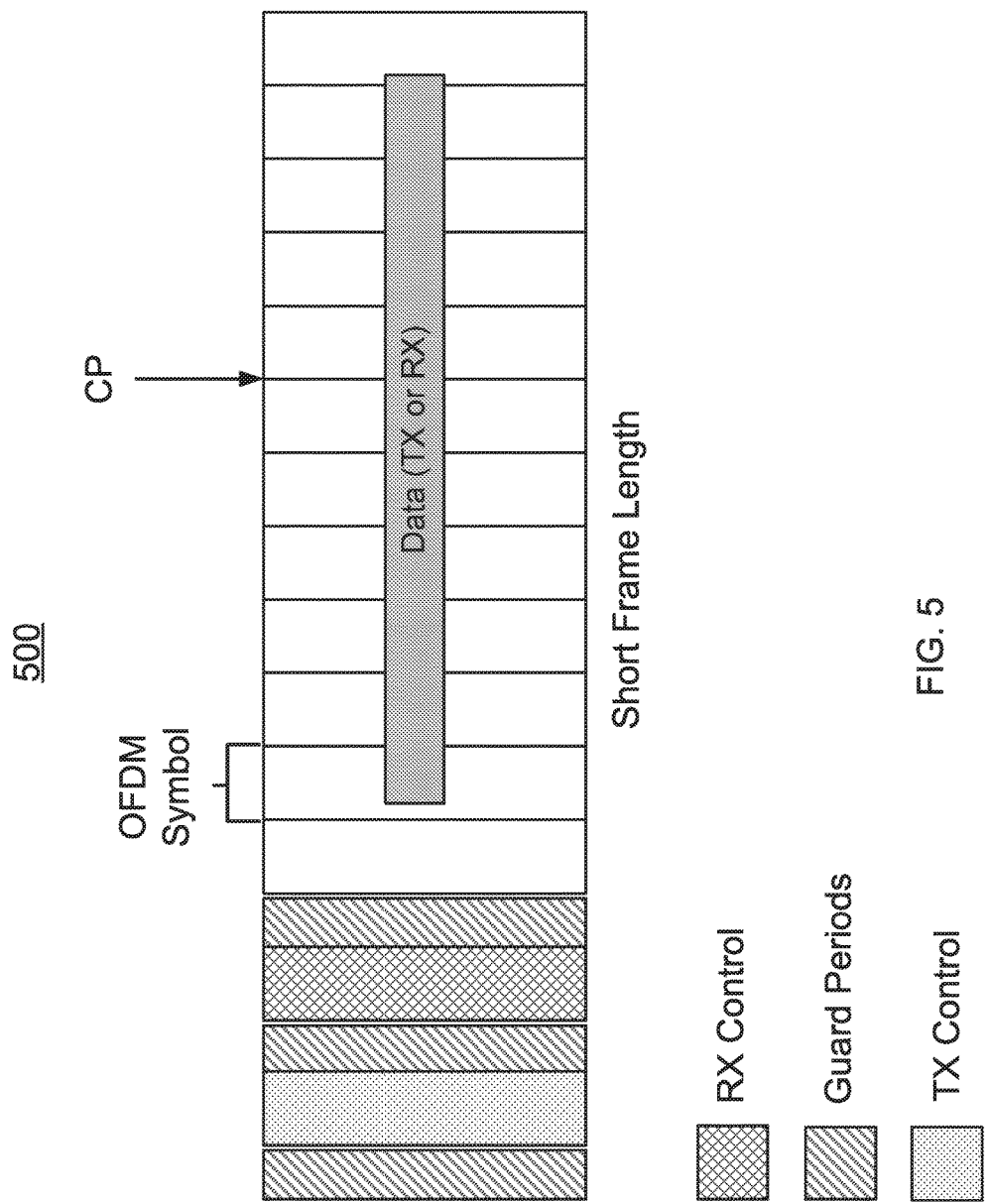
FIG. 5 illustrates a block diagram of a physical frame structure for an extended (DL) self-contained frame in accordance with an example.

FIG. 5 illustrates a block diagram 500 of a physical frame structure for an extended (DL) self-contained frame. The extended self-contained frame structure can include one or more guard periods, transmission (TX) control data, reception (RX) control data, and one or more OFDM symbols, and/or one or more cyclic prefixes (CP). The extended self-contained frame structure can enable achieving low latency and energy consumption for a TDD mode optimization.

Figure 6:
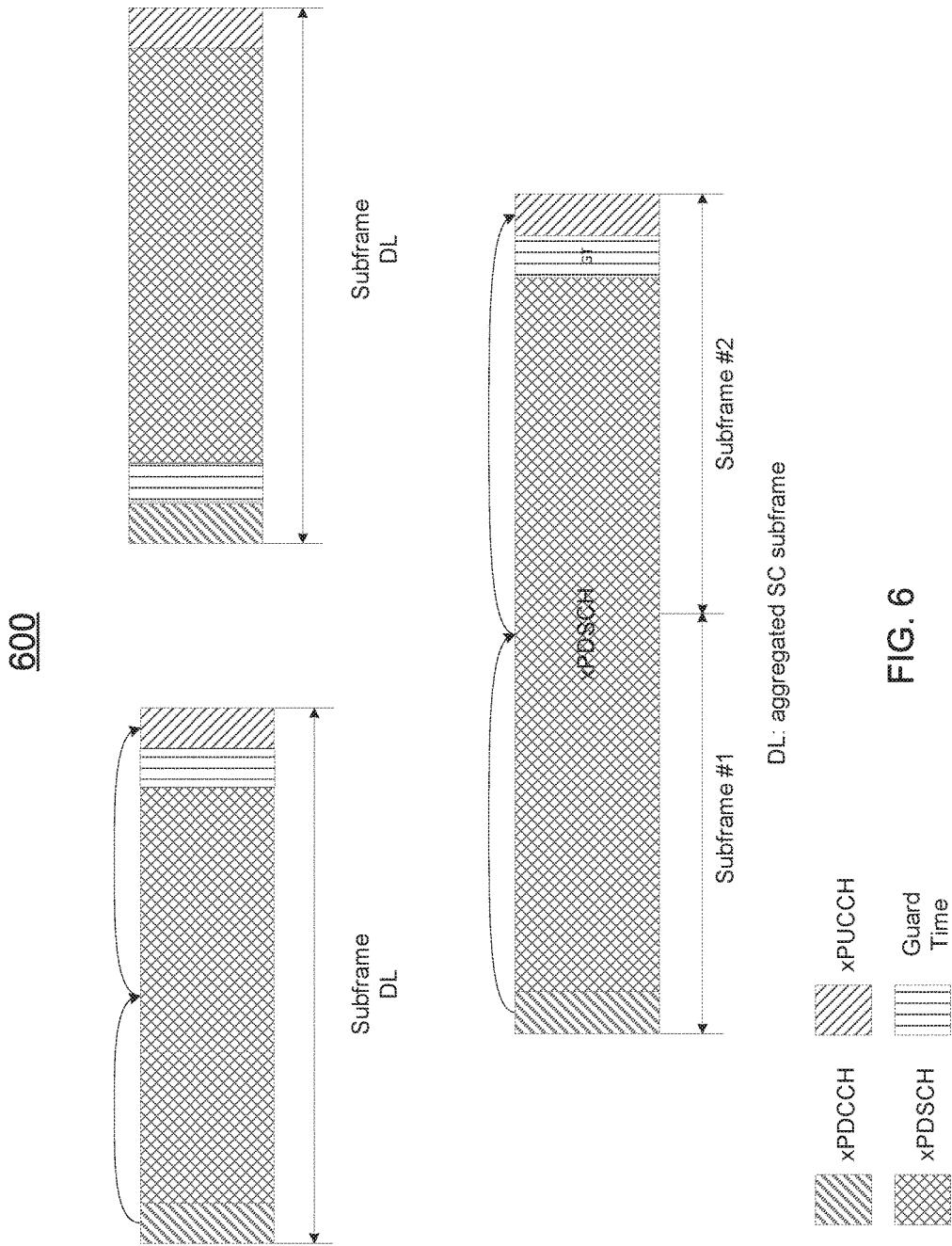
FIG. 6 illustrates a block diagram of an extended downlink (DL) self-contained frame, an extended uplink (UL) self-contained frame, and extended self-contained frame aggregation in the downlink (DL) in accordance with an example.

FIG. 6 illustrates a block diagram of an extended downlink (DL) self-contained frame, an extended uplink (UL) self-contained frame, and extended self-contained frame aggregation in the downlink (DL). More specifically, FIG. 6 depicts an enhanced downlink (DL) self-contained time division duplex (TDD) subframe and a self-contained time division duplex (TDD) subframe aggregation in the downlink (DL). In particular, an extended physical downlink shared channel xPDSCH can be scheduled by an extended physical downlink control channel (xPDCCH) and can be transmitted immediately after the xPDCCH. Following the decoding of the xPDSCH, one or more UEs can feedback the ACK/HACK in an extended physical uplink control channel (xPUCCH) in a selected section of the subframe, such as in the last section (or part) of the subframe. In one aspect, a guard time (GT) can be inserted between the xPDSCH and the xPUCCH in order to accommodate the DL-to-UL and/or UL-to-DL switching time and round-trip propagation delay, as well as the processing time to decode the xPDSCH at the receiver.

In one aspect, for a large cell size, the round trip propagation delay can be significantly large, and thus the size of the GT can also be large. Thus, in order to further reduce the GT overhead, two or more subframes can be aggregated for one xPDSCH transmission for one UE, as illustrated in FIG. 6. In one aspect, the xPDSCH can span two subframes, such as subframe #1 and subframe #2, and a GT (e.g., guard period) can be inserted in the second subframe, such as in between the xPDSCH and the xPUCCH. In this case, GT overhead can be reduced by half compared to the TDD subframe structure having a single subframe, as shown in FIG. 6. In one aspect, the guard time (GT) can accommodate the DL-to-UL and UL-to-DL switching time and maximum round-trip propagation time. This indicates that the dimension of the GT can cover the largest cell size in a deployed scenario. To reduce the GT overhead and provide more processing time for decoding at the receiver (e.g., at the UE), an additional signal may be inserted after the data transmission. Similarly, cross-carrier scheduling can be used for aggregated extended self-contained frames.

Thus, as indicated in FIG. 3, the extended self-contained frame can be used to achieve a per-cell (or even per network)

coordination of the UL and DL transmissions in a cellular network, such as, for example, a 3GPP LTE 5G network, which can be constrained to be in the sub 6 GHz and/or other spectrum. Turning now to FIG. 7, an example of such a cell-wide UL and DL transmission scheme in 3GPP LTE TDD is provided, based on the example assumption of a 0.2 ms transmission time interval (TTI) (subframe duration).

FIG. 7 illustrates a block diagram 700 of a two-layer structure for an extended (DL) self-contained frame. In one aspect, the two-layer structure for an extended (DL) self-contained frame can be used for one or more different transmission time interval (TTI) length. In one aspect, each of the UEs that allow for a an extended (DL) self-contained frame range of 8 to 12, for example, and support of at least 12 HARQ processes can also support the TDD Coordination Layer with a 3 millisecond (ms) (15 TTIs) RTT if a base station can achieve a minimum delay of 0.8 ms (4 TTIs) from UE ACK/NACK to a next DL grant.

That is, FIG. 7 depicts an example of a more aggressive RTT of 3 ms. The RTT is 3 ms, and the TTI is 0.2 ms. The number of HARQ processes is 12. A UE can have a minimum DL grant to ACK/NACK that can be less than 0.8 ms. A UE can have a maximum DL grant to ACK/NACK that can be less than 2.2 ms. A base station can have a minimum ACK/NACK to DL grant that can be less than 0.4 ms. A base station can have a maximum ACK/NACK to DL grant that can be less than 1.6 ms.

For example, FIG. 8 illustrates a first example of a high performance device category of an enhanced self-contained time frame operating at 2 milliseconds (ms) round trip time (RTT). That is, FIG. 8 depicts an example of a more aggressive RTT of 2 ms. In FIG. 8, the HARQ instances are depicted on the TDD coordination layer and a TTI. The RTT is 2 ms, and the TTI is 0.2 ms. The number of HARQ processes is 8. A UE can have a minimum DL grant to ACK/NACK that can be less than 0.8 ms. A base station can have a minimum ACK/NACK to DL grant that can be less than 0.4 ms.

Turning now to FIG. 9 a table 900 of UE categories matched into 5 subframes of enhanced self-contained time frame of time division domain (TDD) coordination grid over different minimum lengths of the enhanced self-contained frame is depicted. Table 900 depicts UE category parameters versus (vs.) a cell-wide TTD coordination. In one aspect, the UE categories can be matched into one or more subframes (e.g., a 5 SFs long TDD coordination grid). The UE category parameters can be used over different minimum enhanced self-contained frame lengths (e.g. #1 and #5, #n and #n+k).

It should also be noted that the enhanced self-contained frame can be used and formed for the UL stream involving the base station receiver's critical path. In one aspect, the enhanced UL self-contained frame can include one or more subframes (SF). In one aspect, the enhanced UL self-contained frame can include UL data, DL control data, eNB N/ACK and a next UL grant. In one aspect, the one or more SFs can each include symbols for data and/or DL control transmission to the eNB. In one aspect, one of the SFs (trailing SF or leading SF) can include DL control data for the UL grant. In one aspect, the one or more SFs can overlap in the enhanced self-contained frame on DL control data. In one aspect, the enhanced self-contained frame can include a UL SF that can contain UL data, UL control data, and one or more reference symbols (RSs). In one aspect, one or more base station classes can be defined that can define the base station's limitations on per UE HARQ processing as well as the base station's receiver capabilities in terms of the UL SFB.

In one aspect, the enhanced UL self-contained frame can use aggregated UL control data in a single time division multiplexing (TDM) and/or multiple frequency domain multiplexing (FDM) PUCCH OFDM symbols. In one aspect, the UL control data can alternatively spill-over into the PUSCH OFDM symbols of the same subframe. In one aspect, the ACK/NACK versus channel state information or simplifying CSI reporting can be introduced to make UL control data of multiple HARQ processes be contained into a single UL OFDM symbol. In one aspect, delta coding of the UL control data of multiple HARQ processes can be used.

In one aspect, cross-subframe scheduling (e.g., DL grant earlier than DL data) can be employed. Optional multi-SF transport blocks can be used in order to allow for working with a transmission pipeline initiation interval of more than 1 SF. In one aspect, the extended self-contained frame can allow for implementing the DL control channel in FDM in one or more subframe types. In one aspect, the extended self-contained frame can allow for implementing one or more various types of reference symbol structures depending on the subframe types.

Figure 10:
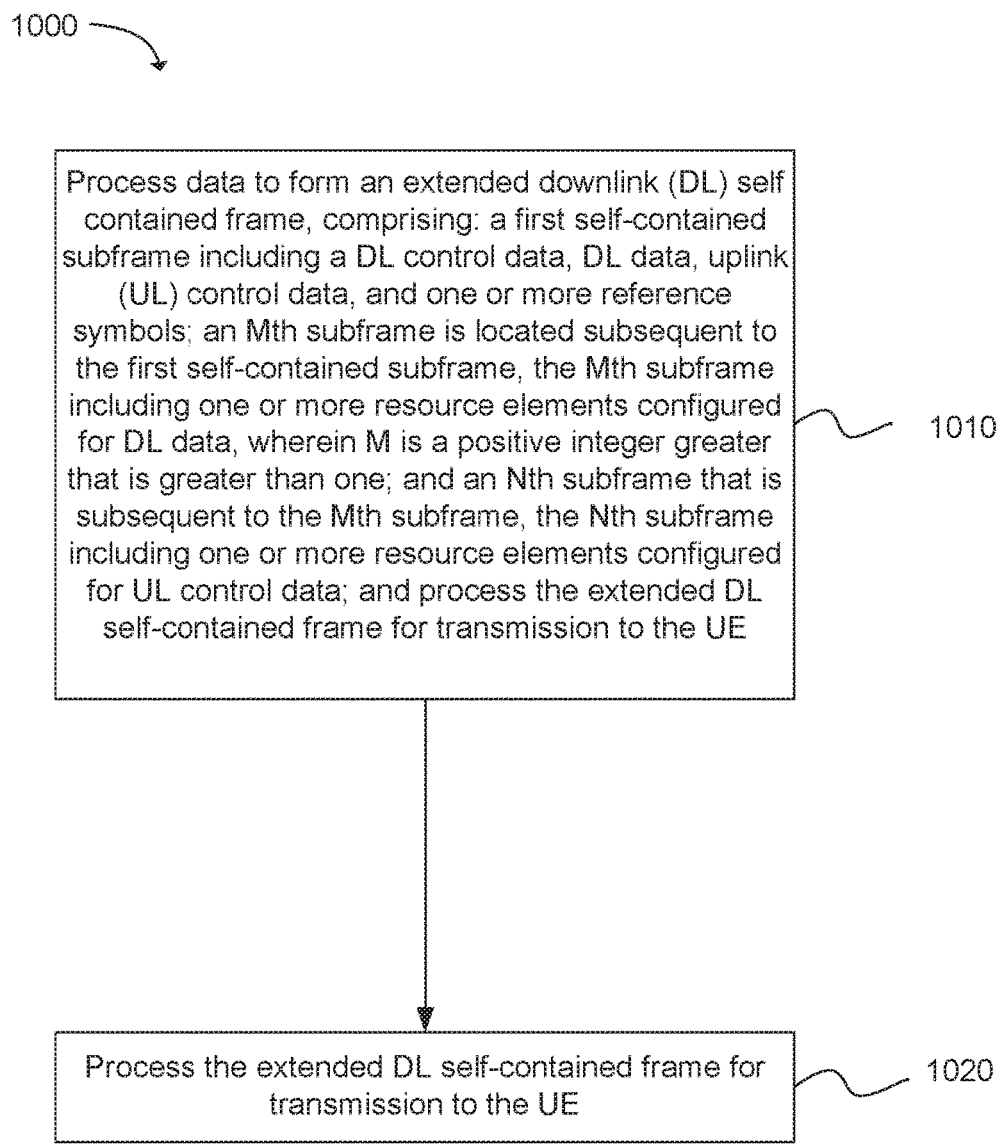
FIG. 10 depicts additional functionality of an eNodeB operable to communicate with a User Equipment (UE), within a wireless communication network, using an enhanced self-contained time frame in accordance with an example.

Turning now to FIG. 10, an example provides functionality 1000 of an eNodeB operable to communicate with a User Equipment (UE) using an enhanced self-contained frame, as shown in the flow chart in FIG. 10. The functionality 1000 can be implemented as a method or the functionality can be executed as instructions on a machine, where the instructions are included one or more computer readable mediums or one or more transitory or non-transitory machine readable storage mediums. The eNodeB can comprise one or more processors and memory configured to: process data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data, as in block 1010. The eNodeB can process the extended DL self-contained frame for transmission to the UE, as in block 1020.

Figure 11:
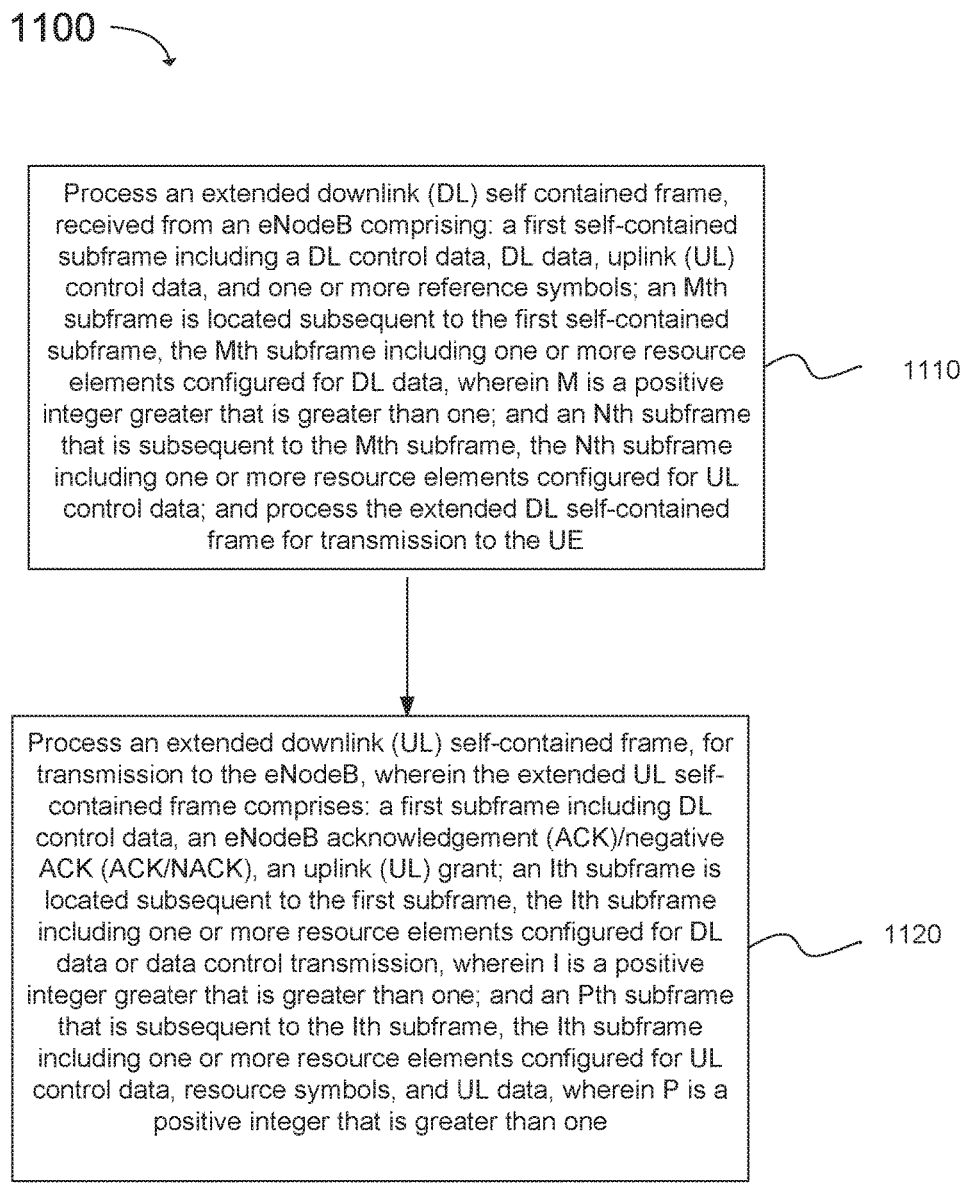
FIG. 11 depicts functionality of a user equipment (UE) to communicate with an eNodeB, within a wireless communication network, using an enhanced self-contained time frame in accordance with an example.

Another example provides functionality 1100 of a user equipment (UE) operable to communicate with an eNodeB using a self-contained frame, as shown in the flow chart in FIG. 11. The functionality 1100 can be implemented as a method or the functionality can be executed as instructions on a machine, where the instructions are included one or more computer readable mediums or one or more transitory or non-transitory machine readable storage mediums. The UE can comprise one or more processors and memory configured to: process an extended downlink (DL) self contained frame, received from an eNodeB comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data; and process the extended DL self-contained frame for transmission to the UE, as in block 1110. The UE can comprise one or more processors and memory configured to: process an extended downlink (UL) self-contained frame, for transmission to the eNodeB, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and an Pth subframe that is subsequent to the Ith subframe, the Ith subframe including one or more resource elements configured for UL control data, reference symbols, and UL data, wherein P is a positive integer that is greater than one, as in block 1120.

Figure 12:
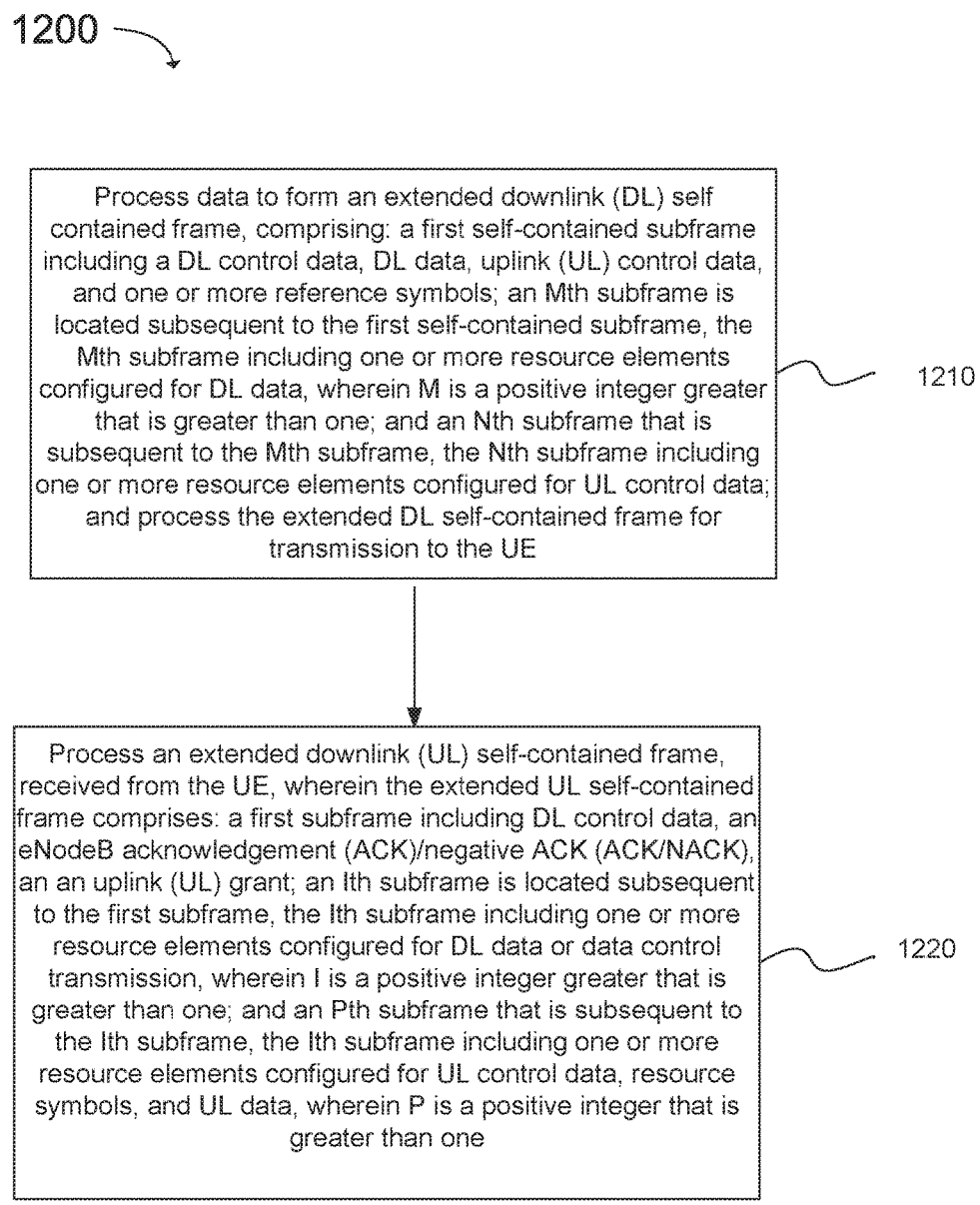
FIG. 12 depicts additional functionality of an eNodeB operable to communicate with a User Equipment (UE), within a wireless communication network, using an enhanced self-contained time frame in accordance with an example.

Another example provides functionality 1200 of an eNodeB operable to communicate with a User Equipment (UE) using an extended self-contained frame, as shown in the flow chart in FIG. 12. The functionality 1200 can be implemented as a method or the functionality can be executed as instructions on a machine, where the instructions are included one or more computer readable mediums or one or more transitory or non-transitory machine readable storage mediums. The eNodeB can comprise one or more processors and memory configured to: process data to form an extended downlink (DL) self contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data; and process the extended DL self-contained frame for transmission to the UE, as in block 1210. The eNodeB can process an extended downlink (UL) self-contained frame, received from the UE, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and an Pth subframe that is subsequent to the Ith subframe, the Ith subframe including one or more resource elements configured for UL control data, reference symbols, and UL data, wherein P is a positive integer that is greater than one, as in block 1220.

Figure 13:
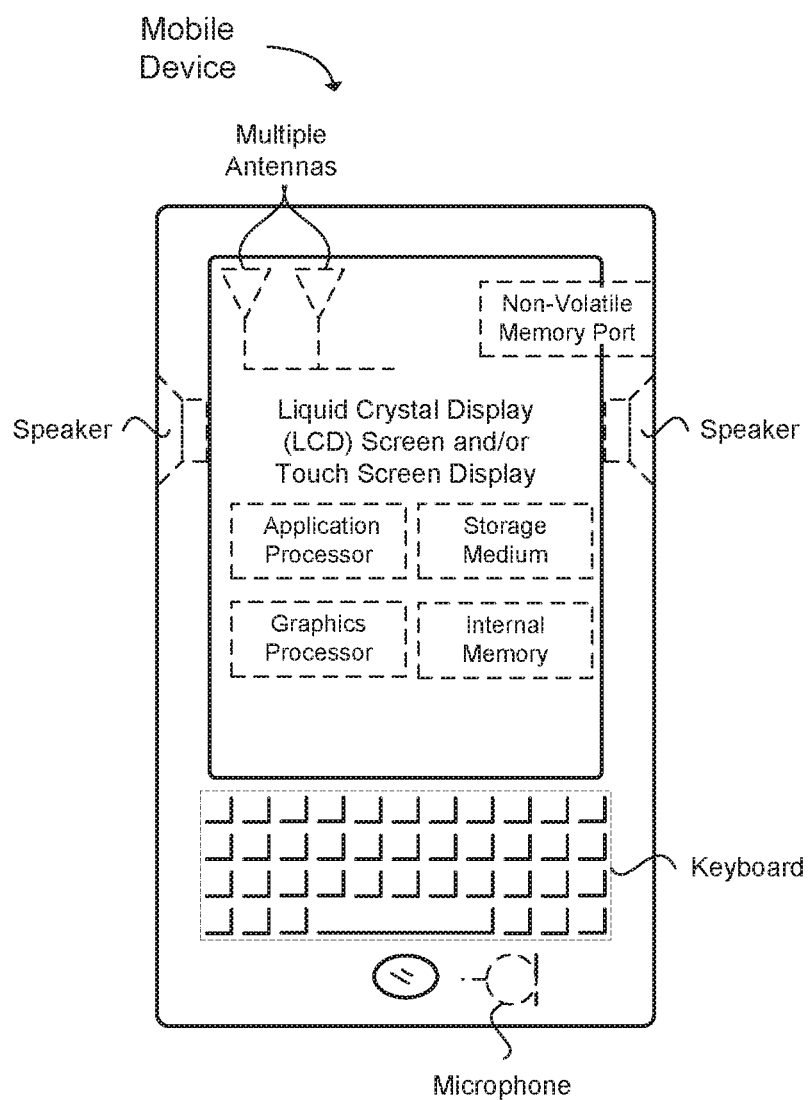
FIG. 13 illustrates a diagram of example components of a wireless device (e.g. User Equipment "UE") device in accordance with an example.

FIG. 13 illustrates a diagram of a wireless device (e.g., UE) in accordance with an example. FIG. 13 provides an example illustration of the wireless device, such as a user equipment (UE) UE, a mobile station (MS), a mobile wireless device, a mobile communication device, a tablet, a handset, or other type of wireless device. In one aspect, the wireless device can include at least one of an antenna, a touch sensitive display screen, a speaker, a microphone, a graphics processor, a baseband processor, an application processor, internal memory, a non-volatile memory port, and combinations thereof.

The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The mobile device can include a storage medium. In one aspect, the storage medium can be associated with and/or communicate with the application processor, the graphics processor, the display, the non-volatile memory port, and/or internal memory. In one aspect, the application processor and graphics processor are storage mediums.

Figure 14:
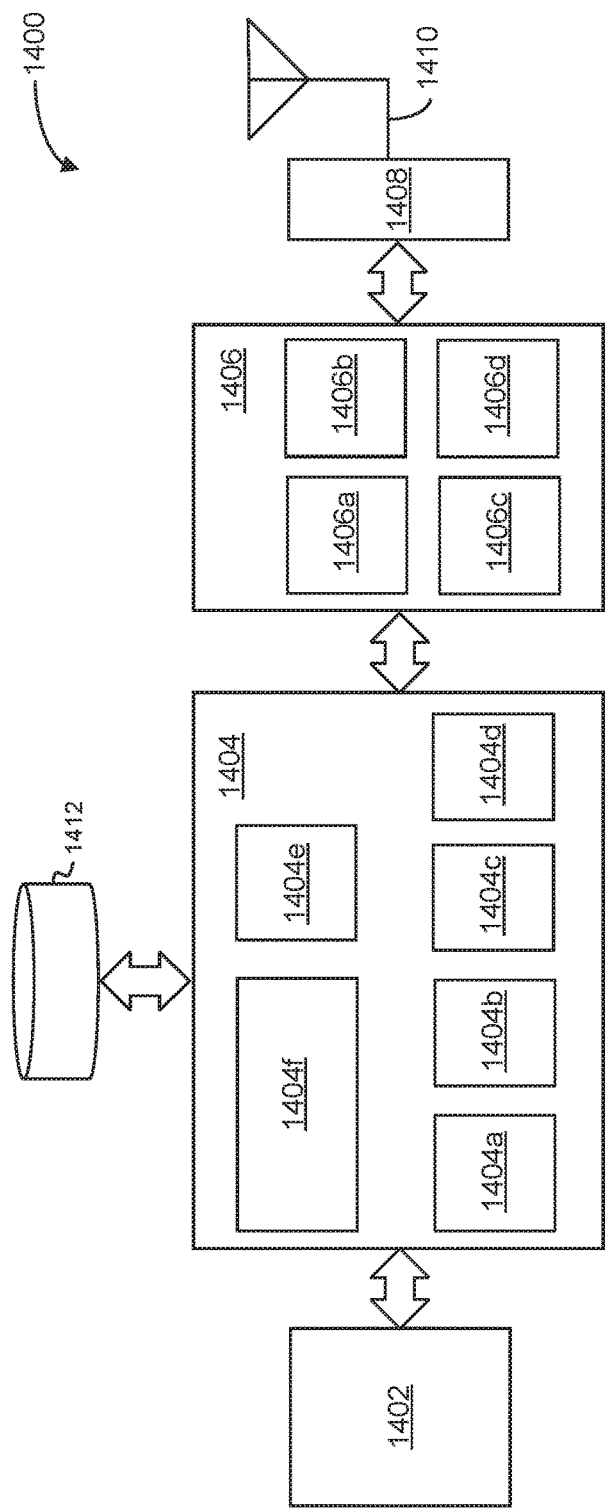
FIG. 14 illustrates a diagram of example components of a User Equipment (UE) device in accordance with an example.

FIG. 14 illustrates a diagram of example components of a User Equipment (UE) device in accordance with an example. FIG. 14 illustrates, for one aspect, example components of a User Equipment (UE) device 1400. In some aspects, the UE device 1400 can include application circuitry 1402, baseband circuitry 1404, Radio Frequency (RF) circuitry 1406, front-end module (FEM) circuitry 1408 and one or more antennas 1410, coupled together at least as shown.

The application circuitry 1402 can include one or more application processors. For example, the application circuitry 1402 can include circuitry such as, but not limited to, one or more single-core or multi-core processors. The processor(s) can include any combination of general-purpose processors and dedicated processors (e.g., graphics processors, application processors, etc.). The processors can be coupled with and/or can include memory/storage and can be configured to execute instructions stored in the memory/storage to enable various applications and/or operating systems to run on the system.

The processor(s) can include any combination of general-purpose processors and dedicated processors (e.g., graphics processors, application processors, etc.). The processors can be coupled with and/or can include a storage medium 1412, and can be configured to execute instructions stored in the storage medium 1412 to enable various applications and/or operating systems to run on the system.

The baseband circuitry 1404 can include circuitry such as, but not limited to, one or more single-core or multi-core processors. The baseband circuitry 1404 can include one or more baseband processors and/or control logic to process baseband signals received from a receive signal path of the RF circuitry 1406 and to generate baseband signals for a transmit signal path of the RF circuitry 1406. Baseband processing circuitry 1404 can interface with the application circuitry 1402 for generation and processing of the baseband signals and for controlling operations of the RF circuitry 1406. For example, in some aspects, the baseband circuitry 1404 can include a second generation (2G) baseband processor 1404a, third generation (3G) baseband processor 1404b, fourth generation (4G) baseband processor 1404c, and/or other baseband processor(s) 1404d for other existing generations, generations in development or to be developed in the future (e.g., fifth generation (5G), 6G, etc.). The baseband circuitry 1404 (e.g., one or more of baseband processors 1404a-d) can handle various radio control functions that enable communication with one or more radio networks via the RF circuitry 1406. The radio control functions can include, but are not limited to, signal modulation/demodulation, encoding/decoding, radio frequency shifting, etc. In some aspects, modulation/demodulation circuitry of the baseband circuitry 1404 can include Fast-Fourier Transform (FFT), precoding, and/or constellation mapping/demapping functionality. In some aspects, encoding/decoding circuitry of the baseband circuitry 1404 can include convolution, tail-biting convolution, turbo, Viterbi, and/or Low Density Parity Check (LDPC) encoder/decoder functionality. Aspects of modulation/demodulation and encoder/decoder functionality are not limited to these examples and can include other suitable functionality in other aspects.

In some aspects, the baseband circuitry 1404 can include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 1404e of the baseband circuitry 1404 can be configured to run elements of the protocol stack for signaling of the PHY, MAC, RLC, PDCP and/or RRC layers. In some aspects, the baseband circuitry can include one or more audio digital signal processor(s) (DSP) 1404f. The audio DSP(s) 1404f can be include elements for compression/decompression and echo cancellation and can include other suitable processing elements in other aspects. Components of the baseband circuitry can be suitably combined in a single chip, a single chipset, or disposed on a same circuit board in some aspects. In some aspects, some or all of the constituent components of the baseband circuitry 1404 and the application circuitry 1402 can be implemented together such as, for example, on a system on a chip (SOC).

In some aspects, the baseband circuitry 1404 can provide for communication compatible with one or more radio technologies. For example, in some aspects, the baseband circuitry 1404 can support communication with an evolved universal terrestrial radio access network (EUTRAN) and/or other wireless metropolitan area networks (WMAN), a wireless local area network (WLAN), a wireless personal area network (WPAN). Aspects in which the baseband circuitry 1404 is configured to support radio communications of more than one wireless protocol can be referred to as multi-mode baseband circuitry.

RF circuitry 1406 can enable communication with wireless networks using modulated electromagnetic radiation through a non-solid medium. In various aspects, the RF circuitry 1406 can include switches, filters, amplifiers, etc. to facilitate the communication with the wireless network. RF circuitry 1406 can include a receive signal path which can include circuitry to down-convert RF signals received from the FEM circuitry 1408 and provide baseband signals to the baseband circuitry 1404. RF circuitry 1406 can also include a transmit signal path which can include circuitry to up-convert baseband signals provided by the baseband circuitry 1404 and provide RF output signals to the FEM circuitry 1408 for transmission.

In some aspects, the RF circuitry 1406 can include a receive signal path and a transmit signal path. The receive signal path of the RF circuitry 1406 can include mixer circuitry 1406a, amplifier circuitry 1406b and filter circuitry 1406c. The transmit signal path of the RF circuitry 1406 can include filter circuitry 1406c and mixer circuitry 1406a. RF circuitry 1406 can also include synthesizer circuitry 1406d for synthesizing a frequency for use by the mixer circuitry 1406a of the receive signal path and the transmit signal path. In some aspects, the mixer circuitry 1406a of the receive signal path can be configured to down-convert RF signals received from the FEM circuitry 1408 based on the synthe-sized frequency provided by synthesizer circuitry 1406d. The amplifier circuitry 1406b can be configured to amplify the down-converted signals and the filter circuitry 1406c can be a low-pass filter (LPF) or band-pass filter (BPF) configured to remove unwanted signals from the down-converted signals to generate output baseband signals. Output baseband signals can be provided to the baseband circuitry 1404 for further processing. In some aspects, the output baseband signals can be zero-frequency baseband signals, although the output baseband signals do not have to be zero-frequency baseband signals. In some aspects, mixer circuitry 1406a of the receive signal path can comprise passive mixers, although the scope of the aspects is not limited in this respect.

In some aspects, the mixer circuitry 1406a of the transmit signal path can be configured to up-convert input baseband signals based on the synthesized frequency provided by the synthesizer circuitry 1406d to generate RF output signals for the FEM circuitry 1408. The baseband signals can be provided by the baseband circuitry 1404 and can be filtered by filter circuitry 1406c. The filter circuitry 1406c can include a low-pass filter (LPF), although the scope of the aspects is not limited in this respect.

In some aspects, the mixer circuitry 1406a of the receive signal path and the mixer circuitry 1406a of the transmit signal path can include two or more mixers and can be arranged for quadrature downconversion and/or upconversion respectively. In some aspects, the mixer circuitry 1406a of the receive signal path and the mixer circuitry 1406a of the transmit signal path can include two or more mixers and can be arranged for image rejection (e.g., Hartley image rejection). In some aspects, the mixer circuitry 1406a of the receive signal path and the mixer circuitry 1406a can be arranged for direct downconversion and/or direct upconversion, respectively. In some aspects, the mixer circuitry 1406a of the receive signal path and the mixer circuitry 1406a of the transmit signal path can be configured for super-heterodyne operation.

In some aspects, the output baseband signals and the input baseband signals can be analog baseband signals, although the scope of the aspects is not limited in this respect. In some alternate aspects, the output baseband signals and the input baseband signals can be digital baseband signals. In these alternate aspects, the RF circuitry 1406 can include analog-to-digital converter (ADC) and digital-to-analog converter (DAC) circuitry and the baseband circuitry 1404 can include a digital baseband interface to communicate with the RF circuitry 1406.

In some dual-mode embodiments, a separate radio IC circuitry can be provided for processing signals for each spectrum, although the scope of the embodiments is not limited in this respect.

In some embodiments, the synthesizer circuitry 1406d can be a fractional-N synthesizer or a fractional N/N+1 synthesizer, although the scope of the embodiments is not limited in this respect as other types of frequency synthesizers can be suitable. For example, synthesizer circuitry 1406d can be a delta-sigma synthesizer, a frequency multiplier, or a synthesizer comprising a phase-locked loop with a frequency divider.

The synthesizer circuitry 1406d can be configured to synthesize an output frequency for use by the mixer circuitry 1406a of the RF circuitry 1406 based on a frequency input and a divider control input. In some embodiments, the synthesizer circuitry 1406d can be a fractional N/N+1 synthesizer.

In some embodiments, frequency input can be provided by a voltage controlled oscillator (VCO), although that is not a constraint. Divider control input can be provided by either the baseband circuitry 1404 or the applications processor 1402 depending on the desired output frequency. In some embodiments, a divider control input (e.g., N) can be determined from a look-up table based on a channel indicated by the applications processor 1402.

Synthesizer circuitry 1406d of the RF circuitry 1406 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1406d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 1406 can include an IQ/polar converter.

FEM circuitry 1408 can include a receive signal path which can include circuitry configured to operate on RF signals received from one or more antennas 1410, amplify the received signals and provide the amplified versions of the received signals to the RF circuitry 1406 for further processing. FEM circuitry 1408 can also include a transmit signal path which can include circuitry configured to amplify signals for transmission provided by the RF circuitry 1406 for transmission by one or more of the one or more antennas 1410.

In some embodiments, the FEM circuitry 1408 can include a TX/RX switch to switch between transmit mode and receive mode operation. The FEM circuitry can include a receive signal path and a transmit signal path. The receive signal path of the FEM circuitry can include a low-noise amplifier (LNA) to amplify received RF signals and provide the amplified received RF signals as an output (e.g., to the RF circuitry 1406). The transmit signal path of the FEM circuitry 1408 can include a power amplifier (PA) to amplify input RF signals (e.g., provided by RF circuitry 1406), and one or more filters to generate RF signals for subsequent transmission (e.g., by one or more of the one or more antennas 1410.

In some embodiments, the UE device 1400 can include additional elements such as, for example, memory/storage, display, camera, sensor, and/or input/output (I/O) interface.

Figure 15:
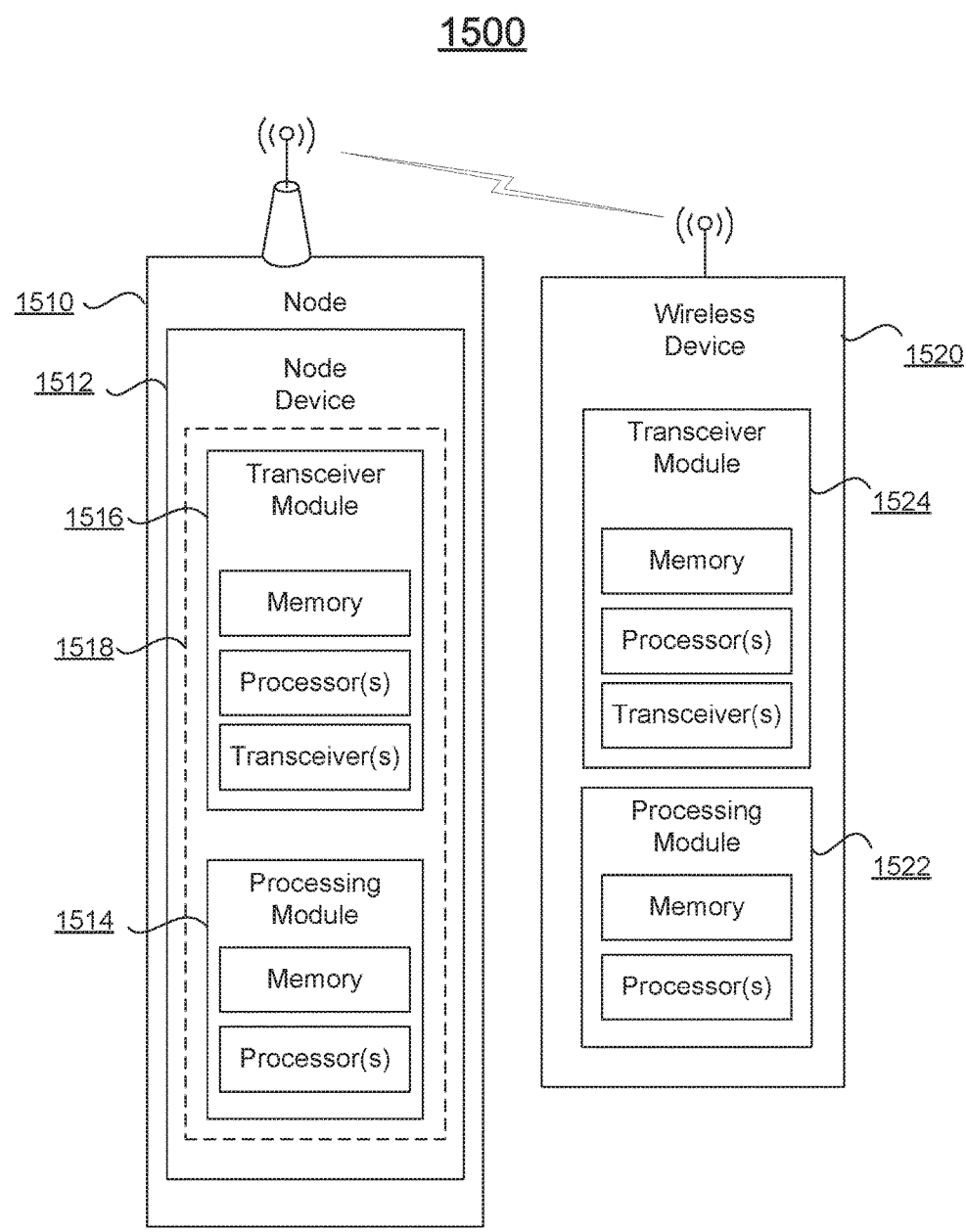
FIG. 15 illustrates a diagram of a node (e.g., eNB) and wireless device (e.g., UE) in accordance with an example.

FIG. 15 illustrates a diagram 1500 of a node 1510 (e.g., eNB and/or a base station) and wireless device (e.g., UE) in accordance with an example. The node can include a base station (BS), a Node B (NB), an evolved Node B (eNB), a baseband unit (BBU), a remote radio head (RRH), a remote radio equipment (RRE), a remote radio unit (RRU), or a central processing module (CPM). In one aspect, the node can be a Serving GPRS Support Node. The node 1510 can include a node device 1512. The node device 1512 or the node 1510 can be configured to communicate with the wireless device 1520. The node device 1512 can be configured to implement the technology described. The node device 1512 can include a processing module 1514 and a transceiver module 1516. In one aspect, the node device 1512 can include the transceiver module 1516 and the processing module 1514 forming a circuitry 1518 for the node 1510. In one aspect, the transceiver module 1516 and the processing module 1514 can form a circuitry of the node device 1512. The processing module 1514 can include one or more processors and memory. In one embodiment, the processing module 1522 can include one or more application processors. The transceiver module 1516 can include a transceiver and one or more processors and memory. In one embodiment, the transceiver module 1516 can include a baseband processor.

The wireless device 1520 can include a transceiver module 1524 and a processing module 1522. The processing module 1522 can include one or more processors and memory. In one embodiment, the processing module 1522 can include one or more application processors. The transceiver module 1524 can include a transceiver and one or more processors and memory. In one embodiment, the transceiver module 1524 can include a baseband processor. The wireless device 1520 can be configured to implement the technology described. The node 1510 and the wireless devices 1520 can also include one or more storage mediums, such as the transceiver module 1516, 1524 and/or the processing module 1514, 1522. It should be noted that one or more components of the transceiver module 1516 can be included in separate devices such as in, for example, a cloud-RAN (C-RAN).

EXAMPLES

The following examples pertain to specific invention embodiments and point out specific features, elements, or steps that can be used or otherwise combined in achieving such embodiments.

Example 1 includes an apparatus of an eNodeB, the eNodeB configured to communicate with a User Equipment (UE), the apparatus comprising one or more processors and memory configured to: process data to form an extended downlink (DL) self-contained frame, comprising a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data, wherein N is a positive integer greater that is greater than one; and process the extended DL self-contained frame for transmission to the UE.

Example 2 includes the apparatus of example 1, wherein the one or more processors and memory are further configured to: puncture data symbols in the extended DL self-contained frame using a controlled pattern to enable uplink control of one or more UEs having shifted extended DL self-contained frames or having one or more of a plurality of extended DL self-contained frame sizes, wherein the controlled pattern is an overlaid enhanced interference mitigation and traffic adaption (eIMTA) pattern.

Example 3 includes the apparatus of example 1 or 2, wherein the one or more processors and memory are further configured to use a critical path by the eNodeB to the UE, wherein the critical path defines a minimum number of subframes in the extended DL self-contained frame, wherein the minimum numbers of subframes include the first self-contained subframe, the Mth subframe, and the Nth subframe.

Example 4 includes the apparatus of example 1, wherein the one or more processors and memory are further configured to: define a minimum number of subframes in the extended DL self-contained frame as equal to a number of UE categories.

Example 5 includes the apparatus of example 1, wherein the one or more processors and memory are further configured to: define a length of the extended DL self-contained frame as equal to at least one of the plurality of subframes.

Example 6 includes the apparatus of example 1 or 5, wherein the one or more processors and memory are further configured to: configure a size of the extended DL self-contained frame to at least equal to or greater than a minimum extended DL self-contained frame size supported by a UE.

Example 7 includes the apparatus of example 1, wherein the one or more processors and memory are further configured to: include in the Nth subframe UL data or blanked data.

Example 8 includes the apparatus of example 1, wherein the one or more processors and memory are further configured to: include in the UL control data an identification to associate with one or more DL data blocks.

Example 9 includes the apparatus of example 1, wherein the extended DL self-contained frame supports one of plurality of subframe types and signalling patterns according to data symbol allocation.

Example 10 includes the apparatus of example 1 or 7, wherein DL data symbol blanking patterns are configured by the eNodeB using UL symbol positions.

Example 11 includes the apparatus of example 1, wherein the one or more processors and memory are further configured to: allocate a DL transmission and an UL transmission by the eNodeB with full dynamic control via DL control data or by enhanced interference mitigation and traffic adaption (eIMTA) patterns.

Example 12 includes the apparatus of example 1 or 11, wherein the full dynamic control via DL control data enables the eNodeB to coordinate data transmission to avoid one or more data collisions and provides a defaulted DL transmission with the DL transmission containing an UL grant having a configurable distance to the DL transmission.

Example 13 includes the apparatus of example 1 or 11, wherein the eIMTA patterns enable the eNodeB to: control one of or more patterns categorized into classes supported by the eNodeB and a UE respectively; control the patterns of a plurality of subframes; or allow for matching the UE having a longest extended DL self-contained frame with a contiguous length of one or more of the plurality of subframes, wherein the UL grant in the DL control data can dynamically override the one or more patterns categorized into classes.

Example 14 includes the apparatus of example 1, wherein the one or more processors and memory are further configured to: process the data to form the extended DL self-contained frame based on a UE category, wherein the UE category includes one or more of a maximum number of hybrid automatic repeat request (HARQ) processes that are supported in the DL transmission, or a minimum number of the subframes in the extended DL self-contained frame that represent a minimum data transmission latency from the DL grant to a UE acknowledgement (ACK)/negative ACK (ACK/NACK).

Example 15 includes the apparatus of example 1, wherein the one or more processors and memory are further configured to: process the data to form the extended DL self-contained frame based on an eNodeB class, the eNodeB class including one or more of a maximum number hybrid automatic repeat request (HARQ) processes that are supported in the UL transmission at the eNodeB per each UE, and a minimum number of a plurality of subframes in the extended DL self-contained frame that are used for data transmission to the UE, a UE acknowledgement (ACK)/negative ACK (ACK/NACK) to the eNodeB, and a UE ACK/NACK or the DL grant for a delay of DL transmission.

Example 16 includes the apparatus of a user equipment (UE), the UE configured to communicate with an eNodeB, the apparatus comprising one or more processors and memory configured to: process an extended downlink (DL) self-contained frame, received from the eNodeB, wherein the extended DL self-contained frame comprises: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data.

Example 17 includes the apparatus of example 16, wherein the one or more processors and memory are further configured to: process an extended downlink (UL) self-contained frame, for transmission to the eNodeB, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and an Pth subframe that is subsequent to the Ith subframe, the Ith subframe including one or more resource elements configured for UL control data, reference symbols, and UL data, wherein P is a positive integer that is greater than one.

Example 18 includes the apparatus of example 16 or 17, wherein a critical path to the UE is used for the extended DL self-contained frame, wherein the critical path wherein the critical path defines a minimum number of subframes in the extended DL self-contained frame, wherein the minimum numbers of subframes include the first self-contained subframe, the Mth subframe, and the Nth subframe.

Example 19 includes the apparatus of example 16, wherein one or more data symbols are punctured in the extended DL self-contained frame using a controlled pattern to a controlled pattern to enable uplink control of one or more UEs having shifted extended DL self-contained frames or having one or more of a plurality of extended DL self-contained frame sizes, wherein the controlled pattern is an overlaid enhanced interference mitigation and traffic adaption (eIMTA) pattern.

Example 20 includes the apparatus of example 16, wherein a minimum number of subframes in the extended DL self-contained frame is defined as equal to a number of UE categories.

Example 21 includes the apparatus of example 16, wherein a length of the extended DL self-contained frame is defined as equal to at least one of the plurality of subframes.

Example 22 includes the apparatus of example 16, wherein a size of the extended DL self-contained frame is at least equal to or greater than a minimum extended DL self-contained frame size supported by the UE.

Example 23 includes the apparatus of example 16, wherein the Nth subframe optionally includes UL data or blanked data, and wherein the UL control data includes an identification to associate with one or more DL data blocks.

Example 24 includes the apparatus of example 16 or 22, wherein the extended DL self-contained frame supports one of plurality of subframe types and signalling patterns according to data symbol allocation.

Example 25 includes the apparatus of example 16, wherein the one or more processors and memory are further configured to: determine, by the UE, using UL symbol positions DL data symbol blanking patterns that are configured by the eNodeB.

Example 26 includes the apparatus of example 16 or 25, wherein the UE includes one of a plurality of parameters for one or more UE categories, wherein the UE category includes one or more of a maximum number of hybrid automatic repeat request (HARQ) processes that are supported in the DL transmission, or a minimum number of the subframes in the extended DL self-contained frame that represent a minimum data transmission latency from the DL grant to a UE acknowledgement (ACK)/negative ACK (ACK/NACK).

Example 27 includes the apparatus of example 16, wherein the apparatus includes at least one of an antenna, a touch sensitive display screen, a speaker, a microphone, a graphics processor, an application processor, a baseband processor, an internal memory, a non-volatile memory port, and combinations thereof.

Example 28 includes at least one machine readable storage medium having instructions embodied thereon for an eNodeB to communicate with a User Equipment (UE), the instructions when executed cause the eNodeB to: process data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data; process the extended DL self-contained frame for transmission to the UE; and process an extended downlink (UL) self-contained frame, received from the UE, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and a Pth subframe that is subsequent to the Ith subframe, the Ith subframe including one or more resource elements configured for UL control data, reference symbols, and UL data, wherein P is a positive integer that is greater than one.

Example 29 includes the at least one machine readable storage medium of example 28, further comprising instructions which when executed cause the eNodeB to, process the extended uplink (UL) self-contained frame, received from the UE, having a UL spacing signal located before or after an extended physical uplink shared channel (xPUSCH).

Example 30 includes the at least one machine readable storage medium of example 28 or 29, further comprising instructions which when executed cause the eNodeB to: use cross-subframe scheduling and/or cross-carrier scheduling to the xPDSCH and the xPUSCH for aggregated extended self-contained TDD subframes, wherein the extended downlink (DL) self-contained frame are located within the DL self-contained TDD subframe prior to an extended physical uplink control channel (xPUCCH); or use cross-carrier HARQ ACK/NACK feedback.

Example 31 includes an apparatus of an eNodeB, the eNodeB configured to communicate with a User Equipment (UE), the apparatus comprising one or more processors and memory configured to: process data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data, wherein N is a positive integer greater that is greater than one; and process the extended DL self-contained frame for transmission to the UE.

Example 32 includes the apparatus of example 31, wherein the one or more processors and memory are further configured to: puncture data symbols in the extended DL self-contained frame using a controlled pattern to enable uplink control of one or more UEs having shifted extended DL self-contained frames or having one or more of a plurality of extended DL self-contained frame sizes, wherein the controlled pattern is an overlaid enhanced interference mitigation and traffic adaption (eIMTA) pattern.

Example 33 includes the apparatus of example 31, wherein the one or more processors and memory are further configured to use a critical path by the eNodeB to the UE, wherein the critical path defines a minimum number of subframes in the extended DL self-contained frame, wherein the minimum numbers of subframes include the first self-contained subframe, the Mth subframe, and the Nth subframe.

Example 34 includes the apparatus of example 31, wherein the one or more processors and memory are further configured to: define a minimum number of subframes in the extended DL self-contained frame as equal to a number of UE categories.

Example 35 includes the apparatus of example 31, wherein the one or more processors and memory are further configured to: define a length of the extended DL self-contained frame as equal to at least one of the plurality of subframes.

Example 36 includes the apparatus of example 31, wherein the one or more processors and memory are further configured to: configure a size of the extended DL self-contained frame to at least equal to or greater than a minimum extended DL self-contained frame size supported by a UE.

Example 37 includes the apparatus of example 31, wherein the one or more processors and memory are further configured to: include in the Nth subframe UL data or blanked data.

Example 38 includes the apparatus of example 31, wherein the one or more processors and memory are further configured to: include in the UL control data an identification to associate with one or more DL data blocks.

Example 39 includes the apparatus of example 31, wherein the extended DL self-contained frame supports one of plurality of subframe types and signalling patterns according to data symbol allocation.

Example 40 includes the apparatus of example 31, wherein DL data symbol blanking patterns are configured by the eNodeB using UL symbol positions.

Example 41 includes the apparatus of example 31, wherein the one or more processors and memory are further configured to: allocate a DL transmission and an UL transmission by the eNodeB with full dynamic control via DL control data or by enhanced interference mitigation and traffic adaption (eIMTA) patterns.

Example 42 includes the apparatus of example 41, wherein the full dynamic control via DL control data enables the eNodeB to coordinate data transmission to avoid one or more data collisions and provides a defaulted DL transmission with the DL transmission containing an UL grant having a configurable distance to the DL transmission.

Example 43 includes the apparatus of example 41, wherein the eIMTA patterns enable the eNodeB to: control one of or more patterns categorized into classes supported by the eNodeB and a UE respectively; control the patterns of a plurality of subframes; or allow for matching the UE having a longest extended DL self-contained frame with a contiguous length of one or more of the plurality of subframes, wherein the UL grant in the DL control data can dynamically override the one or more patterns categorized into classes.

Example 44 includes the apparatus of example 31, wherein the one or more processors and memory are further configured to: process the data to form the extended DL self-contained frame based on a UE category, wherein the UE category includes one or more of a maximum number of hybrid automatic repeat request (HARQ) processes that are supported in the DL transmission, or a minimum number of the subframes in the extended DL self-contained frame that represent a minimum data transmission latency from the DL grant to a UE acknowledgement (ACK)/negative ACK (ACK/NACK).

Example 45 includes the apparatus of example 31, wherein the one or more processors and memory are further configured to: process the data to form the extended DL self-contained frame based on an eNodeB class, the eNodeB class including one or more of a maximum number hybrid automatic repeat request (HARQ) processes that are supported in the UL transmission at the eNodeB per each UE, and a minimum number of a plurality of subframes in the extended DL self-contained frame that are used for data transmission to the UE, a UE acknowledgement (ACK)/negative ACK (ACK/NACK) to the eNodeB, and a UE ACK/NACK or the DL grant for a delay of DL transmission.

Example 46 includes an apparatus of a user equipment (UE), the UE configured to communicate with an eNodeB, the apparatus comprising one or more processors and memory configured to: process an extended downlink (DL) self-contained frame, received from the eNodeB, wherein the extended DL self-contained frame comprises: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data.

Example 47 includes the apparatus of example 46, wherein the one or more processors and memory are further configured to: process an extended downlink (UL) self-contained frame, for transmission to the eNodeB, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and a Pth subframe that is subsequent to the Ith subframe, the Ith subframe including one or more resource elements configured for UL control data, reference symbols, and UL data, wherein P is a positive integer that is greater than one.

Example 48 includes the apparatus of example 46, wherein a critical path to the UE is used for the extended DL self-contained frame, wherein the critical path wherein the critical path defines a minimum number of subframes in the extended DL self-contained frame, wherein the minimum numbers of subframes include the first self-contained subframe, the Mth subframe, and the Nth subframe.

Example 49 includes the apparatus of example 46, wherein one or more data symbols are punctured in the extended DL self-contained frame using a controlled pattern to a controlled pattern to enable uplink control of one or more UEs having shifted extended DL self-contained frames or having one or more of a plurality of extended DL self-contained frame sizes, wherein the controlled pattern is an overlaid enhanced interference mitigation and traffic adaption (eIMTA) pattern.

Example 50 includes the apparatus of example 46, wherein a minimum number of subframes in the extended DL self-contained frame is defined as equal to a number of UE categories.

Example 51 includes the apparatus of example 46, wherein a length of the extended DL self-contained frame is defined as equal to at least one of the plurality of subframes.

Example 52 includes the apparatus of example 46, wherein a size of the extended DL self-contained frame is at least equal to or greater than a minimum extended DL self-contained frame size supported by the UE.

Example 53 includes the apparatus of example 46, wherein the Nth subframe optionally includes UL data or blanked data, and wherein the UL control data includes an identification to associate with one or more DL data blocks.

Example 54 includes the apparatus of example 46, wherein the extended DL self-contained frame supports one of plurality of subframe types and signalling patterns according to data symbol allocation.

Example 55 includes the apparatus of example 46, wherein the one or more processors and memory are further configured to: determine, by the UE, using UL symbol positions DL data symbol blanking patterns that are configured by the eNodeB.

Example 56 includes the apparatus of example 46, wherein the UE includes one of a plurality of parameters for one or more UE categories, wherein the UE category includes one or more of a maximum number of hybrid automatic repeat request (HARQ) processes that are supported in the DL transmission, or a minimum number of the subframes in the extended DL self-contained frame that represent a minimum data transmission latency from the DL grant to a UE acknowledgement (ACK)/negative ACK (ACK/NACK).

Example 57 includes the apparatus of example 46, wherein the apparatus includes at least one of an antenna, a touch sensitive display screen, a speaker, a microphone, a graphics processor, an application processor, a baseband processor, an internal memory, a non-volatile memory port, and combinations thereof.

Example 58 includes at least one non-transitory machine readable storage medium having instructions embodied thereon for an eNodeB to communicate with a User Equipment (UE), the instructions when executed cause the eNodeB to: process data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data; process the extended DL self-contained frame for transmission to the UE; and process an extended downlink (UL) self-contained frame, received from the UE, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and a Pth subframe that is subsequent to the Ith subframe, the Ith subframe including one or more resource elements configured for UL control data, reference symbols, and UL data, wherein P is a positive integer that is greater than one.

Example 59 includes the at least one non-transitory machine readable storage medium of example 58, further comprising instructions which when executed cause the eNodeB to, process the extended uplink (UL) self-contained frame, received from the UE, having a UL spacing signal located before or after an extended physical uplink shared channel (xPUSCH).

Example 60 includes the at least one non-transitory machine readable storage medium of example 58, further comprising instructions which when executed cause the eNodeB to: use cross-subframe scheduling and/or cross-carrier scheduling to the xPDSCH and the xPUSCH for aggregated extended self-contained TDD subframes, wherein the extended downlink (DL) self-contained frame are located within the DL self-contained TDD subframe prior to an extended physical uplink control channel (xPUCCH); or use cross-carrier HARQ ACK/NACK feedback.

Example 61 includes an apparatus of an eNodeB, the eNodeB configured to communicate with a User Equipment (UE), the apparatus comprising one or more processors and memory configured to: process data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data, wherein N is a positive integer greater that is greater than one; and process the extended DL self-contained frame for transmission to the UE.

Example 62 includes the apparatus of example 61, wherein the one or more processors and memory are further configured to: puncture data symbols in the extended DL self-contained frame using a controlled pattern to enable uplink control of one or more UEs having shifted extended DL self-contained frames or having one or more of a plurality of extended DL self-contained frame sizes, wherein the controlled pattern is an overlaid enhanced interference mitigation and traffic adaption (eIMTA) pattern; use a critical path by the eNodeB to the UE, wherein the critical path defines a minimum number of subframes in the extended DL self-contained frame, wherein the minimum numbers of subframes include the first self-contained subframe, the Mth subframe, and the Nth subframe; define a minimum number of subframes in the extended DL self-contained frame as equal to a number of UE categories; define a length of the extended DL self-contained frame as equal to at least one of the plurality of subframes; configure a size of the extended DL self-contained frame to at least equal to or greater than a minimum extended DL self-contained frame size supported by a UE.

Example 63 includes the apparatus of example 61 or 62, wherein the one or more processors and memory are further configured to: include in the Nth subframe UL data or blanked data; or include in the UL control data an identification to associate with one or more DL data blocks.

In Example 64, the subject matter of Example 61 or any of the Examples described herein may further include, wherein the extended DL self-contained frame supports one of plurality of subframe types and signalling patterns according to data symbol allocation, wherein DL data symbol blanking patterns are configured by the eNodeB using UL symbol positions, wherein the one or more processors and memory are further configured to: allocate a DL transmission and an UL transmission by the eNodeB with full dynamic control via DL control data or by enhanced interference mitigation and traffic adaption (eIMTA) patterns, wherein the full dynamic control via DL control data enables the eNodeB to coordinate data transmission to avoid one or more data collisions and provides a defaulted DL transmission with the DL transmission containing an UL grant having a configurable distance to the DL transmission.

In Example 65, the subject matter of Example 61 or any of the Examples described herein may further include, wherein the eIMTA patterns enable the eNodeB to: control one of or more patterns categorized into classes supported by the eNodeB and a UE respectively; control the patterns of a plurality of subframes; or allow for matching the UE having a longest extended DL self-contained frame with a contiguous length of one or more of the plurality of subframes, wherein the UL grant in the DL control data can dynamically override the one or more patterns categorized into classes.

In Example 66, the subject matter of Example 61 or any of the Examples described herein may further include, wherein the one or more processors and memory are further configured to: process the data to form the extended DL self-contained frame based on a UE category, wherein the UE category includes one or more of a maximum number of hybrid automatic repeat request (HARQ) processes that are supported in the DL transmission, or a minimum number of the subframes in the extended DL self-contained frame that represent a minimum data transmission latency from the DL grant to a UE acknowledgement (ACK)/negative ACK (ACK/NACK), or wherein the one or more processors and memory are further configured to: process the data to form the extended DL self-contained frame based on an eNodeB class, the eNodeB class including one or more of a maximum number hybrid automatic repeat request (HARQ) processes that are supported in the UL transmission at the eNodeB per each UE, and a minimum number of a plurality of subframes in the extended DL self-contained frame that are used for data transmission to the UE, a UE acknowledgement (ACK)/negative ACK (ACK/NACK) to the eNodeB, and a UE ACK/NACK or the DL grant for a delay of DL transmission.

Example 67 includes an apparatus of a user equipment (UE), the UE configured to communicate with an eNodeB, the apparatus comprising one or more processors and memory configured to: process an extended downlink (DL) self-contained frame, received from the eNodeB, wherein the extended DL self-contained frame comprises: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data.

Example 68 includes the apparatus of example 67, wherein the one or more processors and memory are further configured to: process an extended downlink (UL) self-contained frame, for transmission to the eNodeB, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and an Pth subframe that is subsequent to the Ith subframe, the Ith subframe including one or more resource elements configured for UL control data, reference symbols, and UL data, wherein P is a positive integer that is greater than one.

Example 69 includes the apparatus of example 67 or 68, wherein a critical path to the UE is used for the extended DL self-contained frame, wherein the critical path wherein the critical path defines a minimum number of subframes in the extended DL self-contained frame, wherein the minimum numbers of subframes include the first self-contained subframe, the Mth subframe, and the Nth subframe, wherein one or more data symbols are punctured in the extended DL self-contained frame using a controlled pattern to a controlled pattern to enable uplink control of one or more UEs having shifted extended DL self-contained frames or having one or more of a plurality of extended DL self-contained frame sizes, wherein the controlled pattern is an overlaid enhanced interference mitigation and traffic adaption (eIMTA) pattern.

In Example 70, the subject matter of Example 67 or any of the Examples described herein may further include, wherein a minimum number of subframes in the extended DL self-contained frame is defined as equal to a number of UE categories, wherein a length of the extended DL self-contained frame is defined as equal to at least one of the plurality of subframes, wherein a size of the extended DL self-contained frame is at least equal to or greater than a minimum extended DL self-contained frame size supported by the UE, wherein the Nth subframe optionally includes UL data or blanked data, or wherein the UL control data includes an identification to associate with one or more DL data blocks, wherein the extended DL self-contained frame supports one of plurality of subframe types and signalling patterns according to data symbol allocation.

In Example 71, the subject matter of Example 67 or any of the Examples described herein may further include, wherein the one or more processors and memory are further configured to: determine, by the UE, using UL symbol positions DL data symbol blanking patterns that are configured by the eNodeB.

In Example 72, the subject matter of Example 67 or any of the Examples described herein may further include, wherein the UE includes one of a plurality of parameters for one or more UE categories, wherein the UE category includes one or more of a maximum number of hybrid automatic repeat request (HARQ) processes that are supported in the DL transmission, or a minimum number of the subframes in the extended DL self-contained frame that represent a minimum data transmission latency from the DL grant to a UE acknowledgement (ACK)/negative ACK (ACK/NACK).

In Example 73, the subject matter of Example 67 or any of the Examples described herein may further include, wherein the apparatus includes at least one of an antenna, a touch sensitive display screen, a speaker, a microphone, a graphics processor, an application processor, a baseband processor, an internal memory, a non-volatile memory port, and combinations thereof.

Example 74 includes at least one machine readable storage medium having instructions embodied thereon for an eNodeB to communicate with a User Equipment (UE), the instructions when executed cause the eNodeB to: process data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data; process the extended DL self-contained frame for transmission to the UE; and process an extended downlink (UL) self-contained frame, received from the UE, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and a Pth subframe that is subsequent to the Ith subframe, the Ith subframe including one or more resource elements configured for UL control data, reference symbols, and UL data, wherein P is a positive integer that is greater than one.

Example 75 includes the at least one machine readable storage medium of example 74, further comprising instructions which when executed cause the eNodeB to: process the extended uplink (UL) self-contained frame, received from the UE, having a UL spacing signal located before or after an extended physical uplink shared channel (xPUSCH); use cross-subframe scheduling and/or cross-carrier scheduling to the xPDSCH and the xPUSCH for aggregated extended self-contained TDD subframes, wherein the extended downlink (DL) self-contained frame are located within the DL self-contained TDD subframe prior to an extended physical uplink control channel (xPUCCH); or use cross-carrier HARQ ACK/NACK feedback.

Example 76 includes a device to communicate with a User Equipment (UE), the device comprising: means for processing data to form an extended downlink (DL) self-contained frame, comprising: a first self-contained subframe including a DL control data, DL data, uplink (UL) control data, and one or more reference symbols; an Mth subframe is located subsequent to the first self-contained subframe, the Mth subframe including one or more resource elements configured for DL data, wherein M is a positive integer greater that is greater than one; and an Nth subframe that is subsequent to the Mth subframe, the Nth subframe including one or more resource elements configured for UL control data; means for processing the extended DL self-contained frame for transmission to the UE; and means for processing an extended downlink (UL) self-contained frame, received from the UE, wherein the extended UL self-contained frame comprises: a first subframe including DL control data, an eNodeB acknowledgement (ACK)/negative ACK (ACK/NACK), an uplink (UL) grant; an Ith subframe is located subsequent to the first subframe, the Ith subframe including one or more resource elements configured for DL data or data control transmission, wherein I is a positive integer greater that is greater than one; and a Pth subframe that is subsequent to the Ith subframe, the Ith subframe including one or more resource elements configured for UL control data, reference symbols, and UL data, wherein P is a positive integer that is greater than one.

Example 77 includes the device of example 76, further comprising means for processing the extended uplink (UL) self-contained frame, received from the UE, having a UL spacing signal located before or after an extended physical uplink shared channel (xPUSCH).

Example 78 includes the device 76, further comprising: means for use cross-subframe scheduling and/or cross-carrier scheduling to the xPDSCH and the xPUSCH for aggregated extended self-contained TDD subframes, wherein the extended downlink (DL) self-contained frame are located within the DL self-contained TDD subframe prior to an extended physical uplink control channel (xPUCCH); or means for using cross-carrier HARQ ACK/NACK feedback.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some aspects, the circuitry can be implemented in, or functions associated with the circuitry can be implemented by, one or more software or firmware modules. In some aspects, circuitry can include logic, at least partially operable in hardware.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of an eNodeB, the eNodeB configured to communicate with a User Equipment (UE), the apparatus comprising one or more processors and memory configured to:
process data to form an extended downlink (DL) self-contained frame, comprising:
a first self-contained subframe including a DL control data, DL data, uplink (UL) control data, and one or more reference symbols;
an Mth subframe is located subsequent to the first self-contained subframe, the Mth subframe including one or more resource elements configured for DL data, wherein M is a positive integer greater that is greater than one; and
an Nth subframe that is subsequent to the Mth subframe, the Nth subframe including one or more resource elements configured for UL control data, wherein N is a positive integer greater that is greater than one; and
process the extended DL self-contained frame for transmission to the UE.

2. The apparatus of claim 1, wherein the one or more processors and memory are further configured to: puncture data symbols in the extended DL self-contained frame using a controlled pattern to enable uplink control of one or more UEs having shifted extended DL self-contained frames or having one or more of a plurality of extended DL self-contained frame sizes, wherein the controlled pattern is an overlaid enhanced interference mitigation and traffic adaption (eIMTA) pattern.

3. The apparatus of claim 1, wherein the one or more processors and memory are further configured to use a critical path by the eNodeB to the UE, wherein the critical path defines a minimum number of subframes in the extended DL self-contained frame, wherein the minimum numbers of subframes include the first self-contained subframe, the Mth subframe, and the Nth subframe.

4. The apparatus of claim 1, wherein the one or more processors and memory are further configured to: define a minimum number of subframes in the extended DL self-contained frame as equal to a number of UE categories.

5. The apparatus of claim 1, wherein the one or more processors and memory are further configured to: define a length of the extended DL self-contained frame as equal to at least one of the plurality of subframes.

6. The apparatus of claim 1, wherein the one or more processors and memory are further configured to: configure a size of the extended DL self-contained frame to at least equal to or greater than a minimum extended DL self-contained frame size supported by a UE.

7. The apparatus of claim 1, wherein the one or more processors and memory are further configured to: include in the Nth subframe UL data or blanked data.

8. The apparatus of claim 1, wherein the one or more processors and memory are further configured to: include in the UL control data an identification to associate with one or more DL data blocks.

9. The apparatus of claim 1, wherein the extended DL self-contained frame supports one of plurality of subframe types and signalling patterns according to data symbol allocation.

10. The apparatus of claim 1, wherein DL data symbol blanking patterns are configured by the eNodeB using UL symbol positions.

11. The apparatus of claim 1, wherein the one or more processors and memory are further configured to: allocate a DL transmission and an UL transmission by the eNodeB with full dynamic control via DL control data or by enhanced interference mitigation and traffic adaption (eIMTA) patterns.

12. The apparatus of claim 11, wherein the full dynamic control via DL control data enables the eNodeB to coordinate data transmission to avoid one or more data collisions and provides a defaulted DL transmission with the DL transmission containing an UL grant having a configurable distance to the DL transmission.

13. The apparatus of claim 11, wherein the eIMTA patterns enable the eNodeB to:
  control one of or more patterns categorized into classes supported by the eNodeB and a UE respectively;
  control the patterns of a plurality of subframes; or
  allow for matching the UE having a longest extended DL self-contained frame with a contiguous length of one or more of the plurality of subframes, wherein the UL grant in the DL control data can dynamically override the one or more patterns categorized into classes.

14. The apparatus of claim 1, wherein the one or more processors and memory are further configured to: process the data to form the extended DL self-contained frame based on a UE category, wherein the UE category includes one or more of a maximum number of hybrid automatic repeat request (HARQ) processes that are supported in the DL transmission, or a minimum number of the subframes in the extended DL self-contained frame that represent a minimum data transmission latency from the DL grant to a UE acknowledgement (ACK)/negative ACK (ACK/NACK).

15. The apparatus of claim 1, wherein the one or more processors and memory are further configured to: process the data to form the extended DL self-contained frame based on an eNodeB class, the eNodeB class including one or more of a maximum number hybrid automatic repeat request (HARQ) processes that are supported in the UL transmission at the eNodeB per each UE, and a minimum number of a plurality of subframes in the extended DL self-contained frame that are used for data transmission to the UE, a UE acknowledgement (ACK)/negative ACK (ACK/NACK) to the eNodeB, and a UE ACK/NACK or the DL grant for a delay of DL transmission.

16. An apparatus of a user equipment (UE), the UE configured to communicate with an eNodeB, the apparatus comprising one or more processors and memory configured to:
  process an extended downlink (DL) self-contained frame, received from the eNodeB, wherein the extended DL self-contained frame comprises:
    a first self-contained subframe including a DL control data, DL data, uplink (UL) control data, and one or more reference symbols;
    an Mth subframe is located subsequent to the first self-contained subframe, the Mth subframe including one or more resource elements configured for DL data, wherein M is a positive integer greater that is greater than one; and
    an Nth subframe that is subsequent to the Mth subframe, the Nth subframe including one or more resource elements configured for UL control data.

17. The apparatus of claim 16, wherein the one or more processors and memory are further configured to:
  process an extended downlink (UL) self-contained frame, for transmission to the eNodeB, wherein the extended UL self-contained frame comprises:
    a first subframe including DL control data, an eNodeB acknowledgement (ACK)/negative ACK (ACK/NACK), an uplink (UL) grant;
    an Ith subframe is located subsequent to the first subframe, the Ith subframe including one or more resource elements configured for DL data or data control transmission, wherein I is a positive integer greater that is greater than one; and
    an Pth subframe that is subsequent to the Ith subframe, the Ith subframe including one or more resource elements configured for UL control data, reference symbols, and UL data, wherein P is a positive integer that is greater than one.

18. The apparatus of claim 16, wherein a critical path to the UE is used for the extended DL self-contained frame, wherein the critical path wherein the critical path defines a minimum number of subframes in the extended DL self-contained frame, wherein the minimum numbers of subframes include the first self-contained subframe, the Mth subframe, and the Nth subframe.

19. The apparatus of claim 16, wherein one or more data symbols are punctured in the extended DL self-contained frame using a controlled pattern to a controlled pattern to enable uplink control of one or more UEs having shifted extended DL self-contained frames or having one or more of a plurality of extended DL self-contained frame sizes, wherein the controlled pattern is an overlaid enhanced interference mitigation and traffic adaption (eIMTA) pattern.

20. The apparatus of claim 16, wherein a minimum number of subframes in the extended DL self-contained frame is defined as equal to a number of UE categories.

21. The apparatus of claim 16, wherein a length of the extended DL self-contained frame is defined as equal to at least one of the plurality of subframes.

22. The apparatus of claim 16, wherein a size of the extended DL self-contained frame is at least equal to or greater than a minimum extended DL self-contained frame size supported by the UE.

23. The apparatus of claim 16, wherein the Nth subframe optionally includes UL data or blanked data, and wherein the UL control data includes an identification to associate with one or more DL data blocks.

24. The apparatus of claim 16, wherein the extended DL self-contained frame supports one of plurality of subframe types and signalling patterns according to data symbol allocation.

25. The apparatus of claim 16, wherein the one or more processors and memory are further configured to: determine, by the UE, using UL symbol positions DL data symbol blanking patterns that are configured by the eNodeB.

26. The apparatus of claim 16, wherein the UE includes one of a plurality of parameters for one or more UE categories, wherein the UE category includes one or more of a maximum number of hybrid automatic repeat request (HARD) processes that are supported in the DL transmission, or a minimum number of the subframes in the extended DL self-contained frame that represent a minimum data transmission latency from the DL grant to a UE acknowledgement (ACK)/negative ACK (ACK/NACK).

27. The apparatus of claim 16, wherein the apparatus includes at least one of an antenna, a touch sensitive display screen, a speaker, a microphone, a graphics processor, an application processor, a baseband processor, an internal memory, a non-volatile memory port, and combinations thereof.

28. At least one non-transitory machine readable storage medium having instructions embodied thereon for an eNodeB to communicate with a User Equipment (UE), the instructions when executed cause the eNodeB to:
  process data to form an extended downlink (DL) self-contained frame, comprising:
    a first self-contained subframe including a DL control data, DL data, uplink (UL) control data, and one or more reference symbols;
    an Mth subframe is located subsequent to the first self-contained subframe, the Mth subframe including one or more resource elements configured for DL data, wherein M is a positive integer greater that is greater than one; and
    an Nth subframe that is subsequent to the Mth subframe, the Nth subframe including one or more resource elements configured for UL control data;
process the extended DL self-contained frame for transmission to the UE; and
process an extended downlink (UL) self-contained frame, received from the UE, wherein the extended UL self-contained frame comprises:
    a first subframe including DL control data, an eNodeB acknowledgement (ACK)/negative ACK (ACK/NACK), an uplink (UL) grant;
    an Ith subframe is located subsequent to the first subframe, the Ith subframe including one or more resource elements configured for DL data or data control transmission, wherein I is a positive integer greater that is greater than one; and
    a Pth subframe that is subsequent to the Ith subframe, the Ith subframe including one or more resource elements configured for UL control data, reference symbols, and UL data, wherein P is a positive integer that is greater than one.

29. The at least one non-transitory machine readable storage medium of claim 28, further comprising instructions which when executed cause the eNodeB to, process the extended uplink (UL) self-contained frame, received from the UE, having a UL spacing signal located before or after an extended physical uplink shared channel (xPUSCH).

30. The at least one non-transitory machine readable storage medium of claim 28, further comprising instructions which when executed cause the eNodeB to:
    use cross-subframe scheduling and/or cross-carrier scheduling to the xPDSCH and the xPUSCH for aggregated extended self-contained TDD subframes, wherein the extended downlink (DL) self-contained frame are located within the DL self-contained TDD subframe prior to an extended physical uplink control channel (xPUCCH); or
    use cross-carrier HARQ ACK/NACK feedback.

* * * * *